(12) United States Patent
Narita et al.

(10) Patent No.: US 10,978,098 B1
(45) Date of Patent: Apr. 13, 2021

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoyuki Narita, Funabashi Chiba (JP); Masayuki Takagishi, Kunitachi Tokyo (JP); Hirofumi Suto, Ota Tokyo (JP); Hitoshi Iwasaki, Nerima Tokyo (JP); Tazumi Nagasawa, Yokohama Kanagawa (JP); Tomoyuki Maeda, Kawasaki Kanagawa (JP)

(73) Assignees: KABUSHIKI KAISHA TOSHIBA, Tokyo (JP); TOSHIBA ELECTRONIC DEVICE & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/015,534

(22) Filed: Sep. 9, 2020

(30) Foreign Application Priority Data

Mar. 11, 2020 (JP) .............................. JP2020-041882
Jun. 1, 2020 (JP) .............................. JP2020-095413

(51) Int. Cl.
*G11B 5/127* (2006.01)
*G11B 5/012* (2006.01)

(52) U.S. Cl.
CPC ............ *G11B 5/1278* (2013.01); *G11B 5/012* (2013.01)

(58) Field of Classification Search
CPC ........ G11B 5/127; G11B 5/1278; G11B 5/012
USPC ....................................... 360/125.01–125.05
See application file for complete search history.

(56) References Cited

U.S. PATENT DOCUMENTS

| 2018/0268848 A1 | 9/2018 | Narita et al. |
| 2019/0088275 A1 | 3/2019 | Narita et al. |
| 2019/0130954 A1* | 5/2019 | Camsari ................. G11C 11/54 |

FOREIGN PATENT DOCUMENTS

| JP | 2018-156709 A | 10/2018 |
| JP | 2019-57338 A | 4/2019 |

* cited by examiner

*Primary Examiner* — Allen T Cao
(74) *Attorney, Agent, or Firm* — Finnegan, Henderson, Farabow, Garrett & Dunner L.L.P.

(57) ABSTRACT

According to the embodiment, a magnetic recording device includes a magnetic head, a magnetic recording medium, and an electrical circuit. The magnetic head includes a magnetic pole, a first shield, and a stacked body provided between the magnetic pole and the first shield. The stacked body includes first, and second magnetic layers, first, second, and third nonmagnetic layers. An electrical resistance of the stacked body is a first resistance when a current flowing in the stacked body is a first current. The electrical resistance is a second resistance when the current flowing in the stacked body is a second current. The electrical resistance oscillates when the current flowing in the stacked body is a third current. The electrical circuit is configured to supply the second current to the stacked body in a recording operation of using the magnetic head to record information in the magnetic recording medium.

17 Claims, 16 Drawing Sheets

MAGNETIC RECORDING DEVICE

CROSS-REFERENCE TO RELATED APPLICATIONS

This application is based upon and claims the benefit of priority from Japanese Patent Application No. 2020-041882, filed on Mar. 11, 2020, and Japanese Patent Application No. 2020-095413, filed on Jun. 1, 2020; the entire contents of which are incorporated herein by reference.

FIELD

Embodiments of the invention generally relate to a magnetic recording device.

BACKGROUND

Information is recorded in a magnetic recording medium such as a HDD (Hard Disk Drive) or the like by using a magnetic head. It is desirable to increase the recording density of the magnetic recording device.

DETAILED DESCRIPTION

Figure 1:
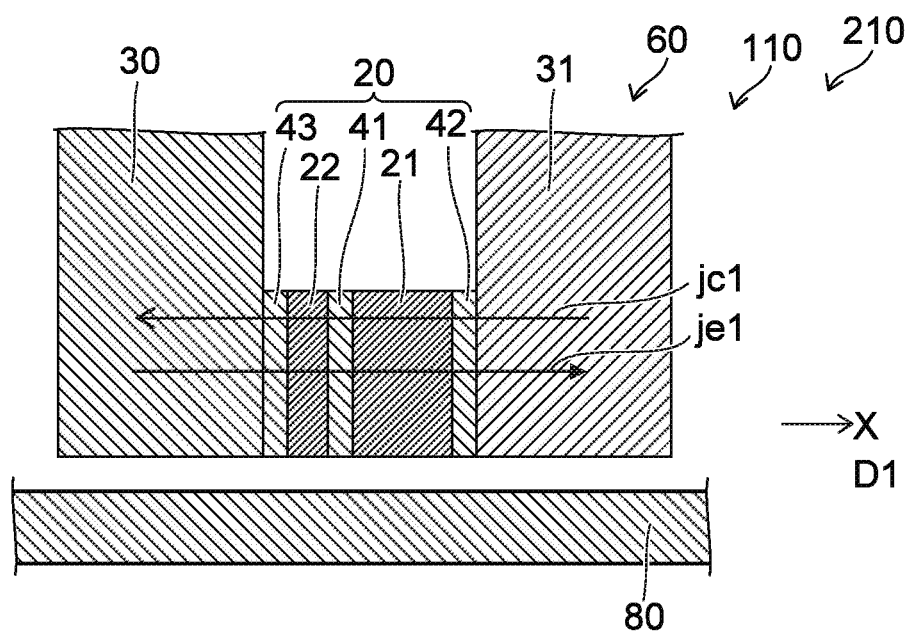
FIG. 1 is a schematic cross-sectional view illustrating a portion of a magnetic recording device according to a first embodiment.

According to an embodiment of the invention, a magnetic recording device includes a magnetic head, a magnetic recording medium, and an electrical circuit. The magnetic head includes a magnetic pole, a first shield, and a stacked body provided between the magnetic pole and the first shield. The stacked body includes a first magnetic layer, a second magnetic layer that is provided between the magnetic pole and the first magnetic layer, a first nonmagnetic layer that is provided between the second magnetic layer and the first magnetic layer, a second nonmagnetic layer that is provided between the first magnetic layer and the first shield, and a third nonmagnetic layer that is provided between the magnetic pole and the second magnetic layer. The second nonmagnetic layer includes at least one selected from the group consisting of Cu, Ag, Au, Al, and Cr. The third nonmagnetic layer includes at least one selected from the group consisting of Ta, Pt, W, Mo, Ir, Ru, Tb, Rh, Cr, and Pd. An electrical resistance of the stacked body is a first resistance when a current flowing in the stacked body is a first current. The electrical resistance of the stacked body is a second resistance, which is greater than the first resistance, when the current flowing in the stacked body is a second current, which is greater than the first current. The electrical resistance of the stacked body oscillates when the current flowing in the stacked body is a third current, which is between the first current and the second current. The electrical circuit is configured to supply the second current to the stacked body in a recording operation of using the magnetic head to record information in the magnetic recording medium.

According to one embodiment, a magnetic recording device includes a magnetic head, a magnetic recording medium, and an electrical circuit. The magnetic head includes a magnetic pole, a first shield, and a stacked body provided between the magnetic pole and the first shield. The stacked body includes a first magnetic layer, a second magnetic layer provided between the first magnetic layer and the first shield, a first nonmagnetic layer provided between the first magnetic layer and the second magnetic layer, a second nonmagnetic layer provided between the magnetic pole and the first magnetic layer, and a third nonmagnetic layer provided between the second magnetic layer and the first shield. The second nonmagnetic layer includes at least one selected from the group consisting of Cu, Ag, Au, Al, and Cr. The third nonmagnetic layer includes at least one selected from the group consisting of Ta, Pt, W, Mo, Ir, Ru, Tb, Rh, Cr, and Pd. An electrical resistance of the stacked body is a first resistance when a current flowing in the stacked body is a first current. The electrical resistance of the stacked body is a second resistance, which is greater than the first resistance, when the current flowing in the stacked body is a second current, which is greater than the first current. The electrical resistance of the stacked body oscillates when the current flowing in the stacked body is a third current, which is between the first current and the second current. The electrical circuit is configured to supply the second current to the stacked body in a recording operation of using the magnetic head to record information in the magnetic recording medium.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic cross-sectional view illustrating a portion of a magnetic recording device according to a first embodiment.

Figure 2:
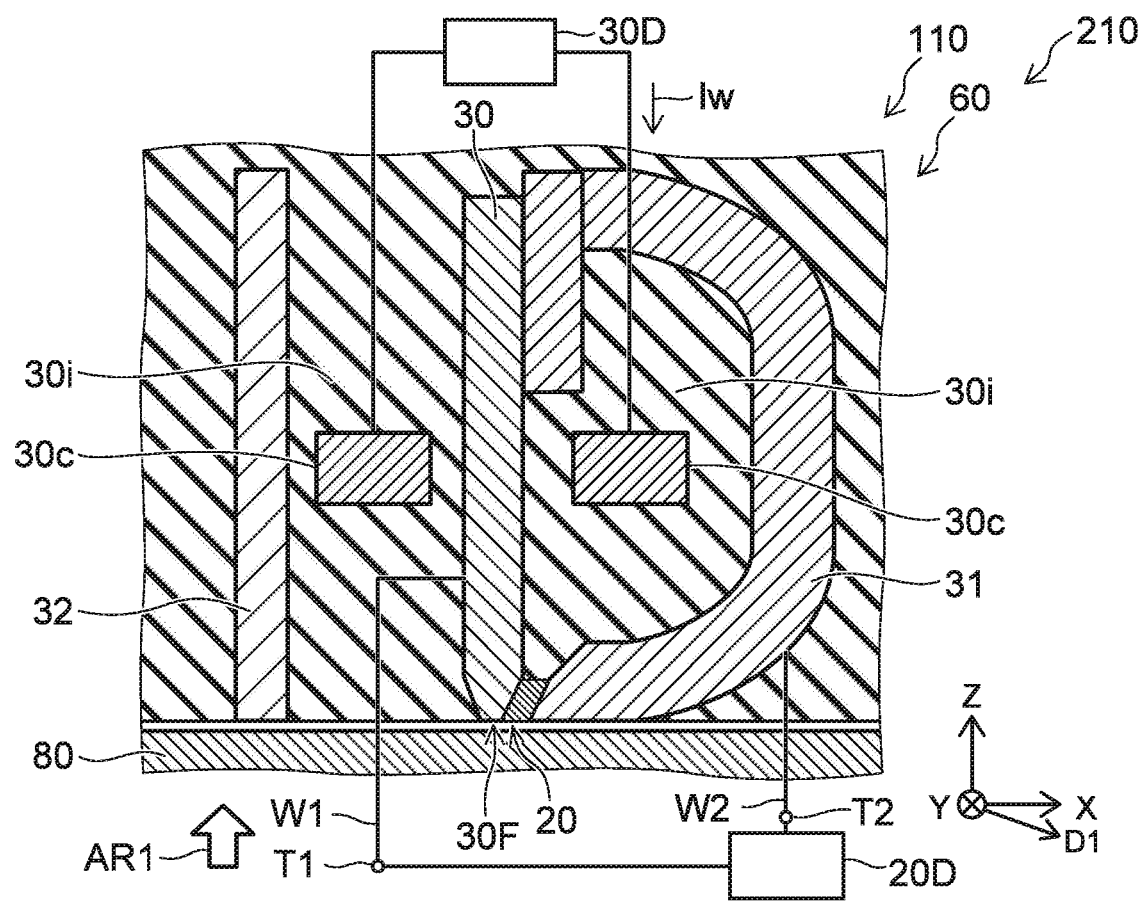
FIG. 2 is a schematic cross-sectional view illustrating the magnetic recording device according to the first embodiment.

FIG. 2 is a schematic cross-sectional view illustrating the magnetic recording device according to the first embodiment.

As shown in FIG. 2, the magnetic recording device 210 according to the embodiment includes a magnetic head 110, a magnetic recording medium 80, and an electrical circuit 20D. A recording operation is performed by the magnetic recording device 210. Information is recorded in the magnetic recording medium 80 by using the magnetic head 110 in the recording operation.

The magnetic head 110 includes a recording part 60. As described below, the magnetic head 110 may include a reproducing part. The recording part 60 includes a magnetic pole 30, a first shield 31, and a stacked body 20. The stacked body 20 is provided between the magnetic pole 30 and the first shield 31.

For example, the magnetic pole 30 and the first shield 31 form a magnetic circuit. The magnetic pole 30 is, for example, a major magnetic pole. The first shield 31 is, for example, a trailing first shield.

The direction from the magnetic recording medium 80 toward the magnetic head 110 is taken as a Z-axis direction. One direction perpendicular to the Z-axis direction is taken as an X-axis direction. A direction perpendicular to the Z-axis direction and the X-axis direction is taken as a Y-axis direction. For example, the Z-axis direction corresponds to the height direction. For example, the X-axis direction corresponds to the down-track direction. For example, the Y-axis direction corresponds to the cross-track direction. The magnetic recording medium 80 and the magnetic head 110 move relatively along the down-track direction. A magnetic field (a recording magnetic field) that is generated from the magnetic head 110 is applied to the desired position of the magnetic recording medium 80. The magnetization of the desired position of the magnetic recording medium 80 is controlled to be in a direction corresponding to the recording magnetic field. Thereby, the information is recorded in the magnetic recording medium 80.

The direction from the magnetic pole 30 toward the first shield 31 is taken as a first direction D1. The first direction D1 substantially corresponds to the X-axis direction. The first direction D1 may be tilted at a small angle with respect to the X-axis direction.

A coil 30c is provided as shown in FIG. 2. In the example, a portion of the coil 30c is between the magnetic pole 30 and the first shield 31. A second shield 32 is provided in the example. The magnetic pole 30 is between the second shield 32 and the first shield 31 in the X-axis direction. Another portion of the coil 30c is between the second shield 32 and the magnetic pole 30. An insulating portion 30i is provided between these multiple components.

As shown in FIG. 2, a recording current Iw is supplied from a recording circuit 30D to the coil 30c. A recording magnetic field that corresponds to the recording current Iw is applied from the magnetic pole 30 to the magnetic recording medium 80.

As shown in FIG. 2, the magnetic pole 30 includes a medium-facing surface 30F. The medium-facing surface 30F is, for example, an ABS (Air Bearing Surface). For example, the medium-facing surface 30F faces the magnetic recording medium 80. For example, the medium-facing surface 30F is along the X-Y plane.

As shown in FIG. 2, the electrical circuit 20D is electrically connected to the stacked body 20. In the example, the stacked body 20 is electrically connected to the magnetic pole 30 and the first shield 31. A first terminal T1 and a second terminal T2 are provided in the magnetic head 110. The first terminal T1 is electrically connected to the stacked body 20 via first wiring W1 and the magnetic pole 30. The second terminal T2 is electrically connected to the stacked body 20 via second wiring W2 and the first shield 31. For example, a current (e.g., a direct current) is supplied from the electrical circuit 20D to the stacked body 20.

As shown in FIG. 1, the stacked body 20 includes a first magnetic layer 21, a second magnetic layer 22, a first nonmagnetic layer 41, a second nonmagnetic layer 42, and a third nonmagnetic layer 43. The second magnetic layer 22 is between the magnetic pole 30 and the first magnetic layer 21. The first nonmagnetic layer 41 is provided between the second magnetic layer 22 and the first magnetic layer 21. The second nonmagnetic layer 42 is provided between the first magnetic layer 21 and the first shield 31. The third nonmagnetic layer 43 is provided between the magnetic pole 30 and the second magnetic layer 22.

For example, the second nonmagnetic layer 42 includes at least one selected from the group consisting of Cu, Ag, Au, Al, and Cr. For example, the second nonmagnetic layer 42 functions as a layer that transmits polarized spin.

The third nonmagnetic layer 43 includes at least one selected from the group consisting of Ta, Pt, W, Mo, Ir, Ru, Tb, Rh, Cr, and Pd. For example, the third nonmagnetic layer 43 functions as a layer that attenuates polarized spin.

For example, the first nonmagnetic layer 41 includes a first material or a second material. The first material includes at least one selected from the group consisting of Cu, Ag, Au, Al, and Cr. The second material includes at least one selected from the group consisting of Ta, Pt, W, Mo, Ir, Ru, Tb, Rh, and Pd. For example, the first nonmagnetic layer 41 may include the first material or the second material described above according to the conditions of the multiple layers included in the stacked body 20.

As shown in FIG. 1, for example, a current jc1 that is supplied from the electrical circuit 20D (referring to FIG. 2) to the stacked body 20 has an orientation from the first shield 31 toward the magnetic pole 30. The current jc1 has an orientation from the first magnetic layer 21 toward the second magnetic layer 22. An electron current je1 has an orientation from the magnetic pole 30 toward the first shield 31.

For example, when the current jc1 is not supplied to the stacked body 20, the orientation of the magnetization of the first magnetic layer 21 is substantially the same as the orientation of the magnetization of the magnetic pole 30 and the orientation of the magnetization of the first shield 31. A portion of the magnetic field (the recording magnetic field) emitted from the magnetic pole 30 is oriented toward the magnetic recording medium 80. On the other hand, another portion of the magnetic field (the recording magnetic field) emitted from the magnetic pole 30 passes through the stacked body 20 and enters the first shield 31 without being oriented toward the magnetic recording medium 80. Therefore, the proportion of the recording magnetic field emitted from the magnetic pole 30 that is oriented toward the magnetic recording medium 80 is low.

When the current jc1 is supplied to the stacked body 20, the orientation of the magnetization of the first magnetic layer 21 is reversed with respect to the orientation of the magnetization of the magnetic pole 30 and the orientation of the magnetization of the first shield 31. Thereby, the magnetic field (the recording magnetic field) that is emitted from the magnetic pole 30 is not easily oriented toward the stacked body 20. Therefore, the proportion of the recording magnetic field emitted from the magnetic pole 30 that is oriented toward the magnetic recording medium 80 is high compared to when the current jc1 is not supplied to the stacked body 20. The recording magnetic field that is emitted from the magnetic pole 30 is effectively applied to the magnetic recording medium 80.

This phenomenon becomes more pronounced as the distance (the recording gap) between the magnetic pole 30 and the first shield 31 is reduced. By using such a stacked body 20, good recording can be performed even when the recording gap is small. According to the embodiment, the recording gap at which good recording is possible can be reduced. According to the embodiment, a magnetic recording device can be provided in which the recording density can be increased.

On the other hand, in MAMR (Microwave Assisted Magnetic Recording), the recording is performed by locally controlling the magnetic properties of the magnetic recording medium 80 by applying, to the magnetic recording medium 80, a high frequency magnetic field generated from a stacked body including multiple magnetic layers. In MAMR, the high frequency magnetic field is generated by the oscillations of the magnetizations of the magnetic layers.

Conversely, in the embodiment, the magnetization of the first magnetic layer 21 reverses with respect to the magnetization of the magnetic pole 30 and the magnetization of the first shield 31. The magnetic field that is emitted from the magnetic pole 30 is efficiently applied to the magnetic recording medium 80 by an operation that is different from MAMR.

An example of characteristics of the magnetic head 110 according to the embodiment will now be described.

Figure 3A:
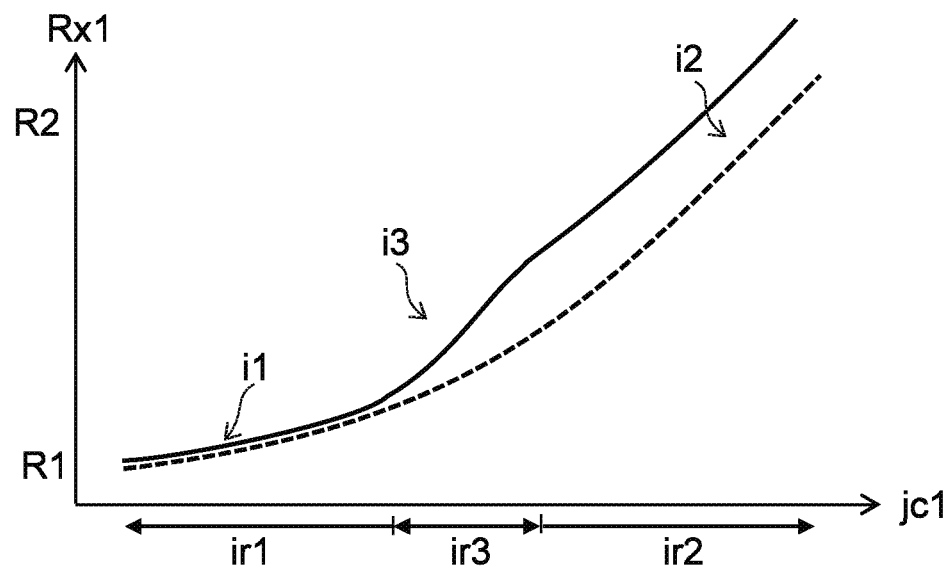
FIGS. 3A and 3B are schematic views illustrating characteristics of the magnetic recording device according to the first embodiment.
Figure 3B:
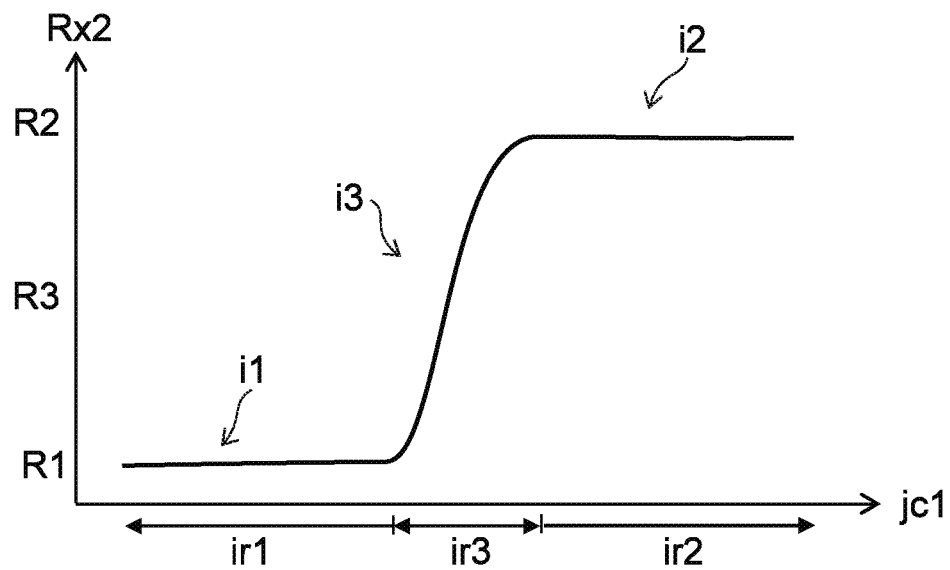

FIGS. 3A and 3B are schematic views illustrating characteristics of the magnetic recording device according to the first embodiment.

These figures schematically show the relationship between the electrical resistance of the stacked body 20 and the magnitude of the current jc1 flowing in the stacked body 20 according to the embodiment. In these figures, the horizontal axis is the magnitude of the current jc1. The vertical axis of FIG. 3A is an electrical resistance Rx1 of the stacked body 20.

As shown in FIG. 3A, the electrical resistance Rx1 increases as the current jc1 increases. As shown in FIG. 3A, the magnitude of the current jc1 can be divided into a first current range ir1, a second current range ir2, and a third current range ir3. The third current range ir3 is between the first current range ir1 and the second current range ir2.

In the first current range ir1 and the second current range ir2, the electrical resistance Rx1 changes as a quadratic function of the magnitude of the current jc1. It is considered that this is caused by the temperature of the stacked body 20 increasing as the current jc1 increases.

The change of the electrical resistance Rx1 in the third current range ir3 is different from the effect of the temperature increase. It is considered that the change of the electrical resistance Rx1 in the third current range ir3 is due to a magnetoresistance effect based on the reversal rates of the magnetizations of the magnetic layers.

FIG. 3B shows the relationship between an electrical resistance Rx2 and the magnitude of the current jc1, in which the change of the quadratic function (the effect of the temperature) of FIG. 3A has been removed. When the effect of the quadratic function is removed as shown in FIG. 3B, the electrical resistance Rx2 is substantially constant in the first current range ir1. Or, compared to the third current range ir3, the electrical resistance Rx2 changes gradually in the first current range ir1. The electrical resistance Rx2 changes in the third current range ir3. The electrical resistance Rx2 is substantially constant in the second current range ir2. Or, compared to the third current range ir3, the electrical resistance Rx2 changes gradually in the second current range ir2.

For example, as shown in FIG. 3B, the electrical resistance Rx2 of the stacked body 20 is a first resistance R1 when the current jc1 flowing in the stacked body 20 is a first current i1. The first current i1 is in the first current range ir1.

As shown in FIG. 3B, the electrical resistance Rx2 of the stacked body 20 is a second resistance R2 when the current jc1 flowing in the stacked body 20 is a second current i2. The second current i2 is greater than the first current i1. The second current i2 is in the second current range ir2. The second resistance R2 is greater than the first resistance R1.

The electrical resistance Rx2 of the stacked body 20 is a third resistance R3 at a third current i3 between the first current i1 and the second current i2. The third current i3 is in the third current range ir3.

For example, the electrical resistance Rx2 substantially does not oscillate when the current jc1 is the first or second current i1 or i2. For example, the electrical resistance Rx2 oscillates when the current jc1 is the third current i3. The first current i1, the second current i2, and the third current i3 have orientations from the first magnetic layer 21 toward the second magnetic layer 22.

Figure 4A:
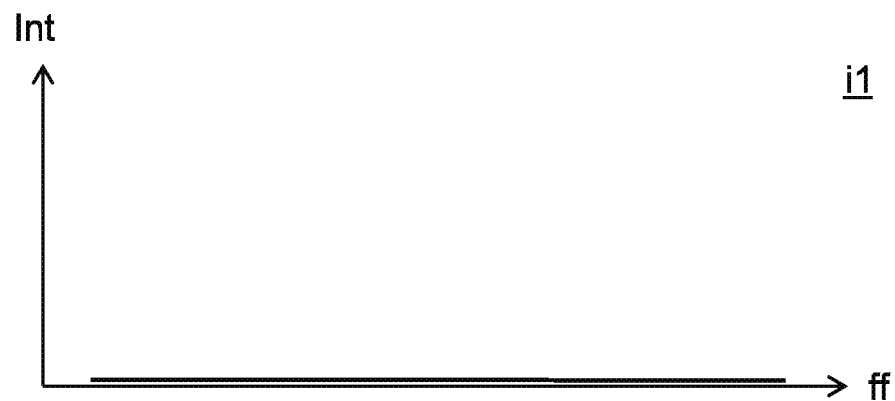
FIGS. 4A to 4C are schematic views illustrating characteristics of the magnetic recording device according to the first embodiment.
Figure 4B:
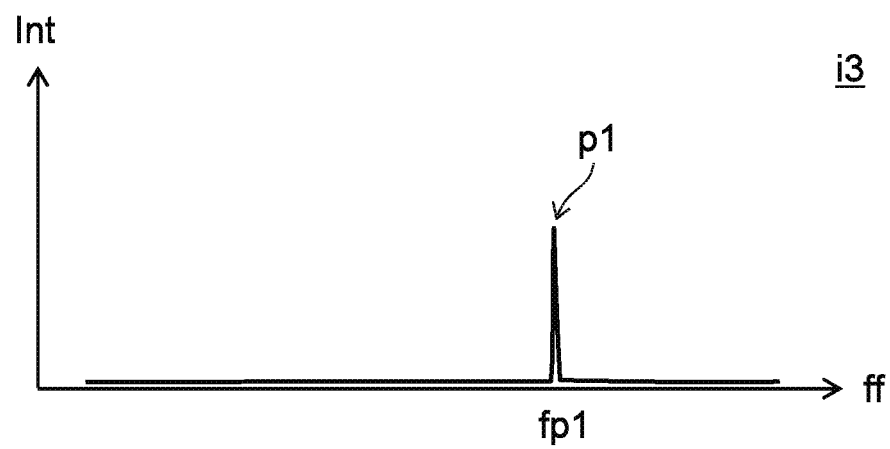
Figure 4C:

FIGS. 4A to 4C are schematic views illustrating characteristics of the magnetic recording device according to the first embodiment.

These figures illustrate signals in which FFT (Fast Fourier Transform) processing of a portion of the signal of the electrical resistance Rx2 is performed. The signal of the electrical resistance Rx2 includes a component (a high frequency component) that changes temporally, and a component (the component of the temporal average value) that substantially does not change temporally. The temporally changing component of the electrical resistance Rx2 is processed by the FFT processing. In these figures, the horizontal axis is a frequency ff. The vertical axis is an intensity Int of the signal. FIG. 4A corresponds to when the current jc1 is the first current i1. FIG. 4B corresponds to when the current jc1 is the third current i3. FIG. 4C corresponds to when the current jc1 is the second current i2.

As shown in FIG. 4B, when the current jc1 is the third current i3, a peak p1 is observed at one frequency fp1. The peak corresponds to a high frequency oscillation being generated by the stacked body 20. For example, there are also cases where the FFT signal that is generated due to the magnetoresistance effect reflects the oscillation state of the magnetization and occurs at multiple frequencies. For example, there are cases where the FFT signal that is generated due to the magnetoresistance effect reflects the oscillation state of the magnetization and is distributed over a wide range of frequencies.

As shown in FIGS. 4A and 4C, the peak p1 is not clearly observed when the current jc1 is the first or second current i1 or i2. For these currents, a magnetization oscillation that is effective for MAMR is substantially not generated.

Thus, the electrical resistance Rx2 of the stacked body 20 oscillates when the current jc1 flowing in the stacked body 20 is the third current i3, which is between the first current i1 and the second current i2.

In the embodiment, the recording operation is performed using the stacked body 20 that has such characteristics.

In the embodiment, the electrical circuit 20D is configured to supply the second current i2 described above to the stacked body 20 in the recording operation of using the magnetic head 110 to record the information in the magnetic recording medium 80. Compared to when the recording operation is performed without supplying the second current i2, the amount of the recording magnetic field oriented from the magnetic pole 30 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the embodiment, a magnetic recording device can be provided in which the recording density can be increased.

Figure 5A:
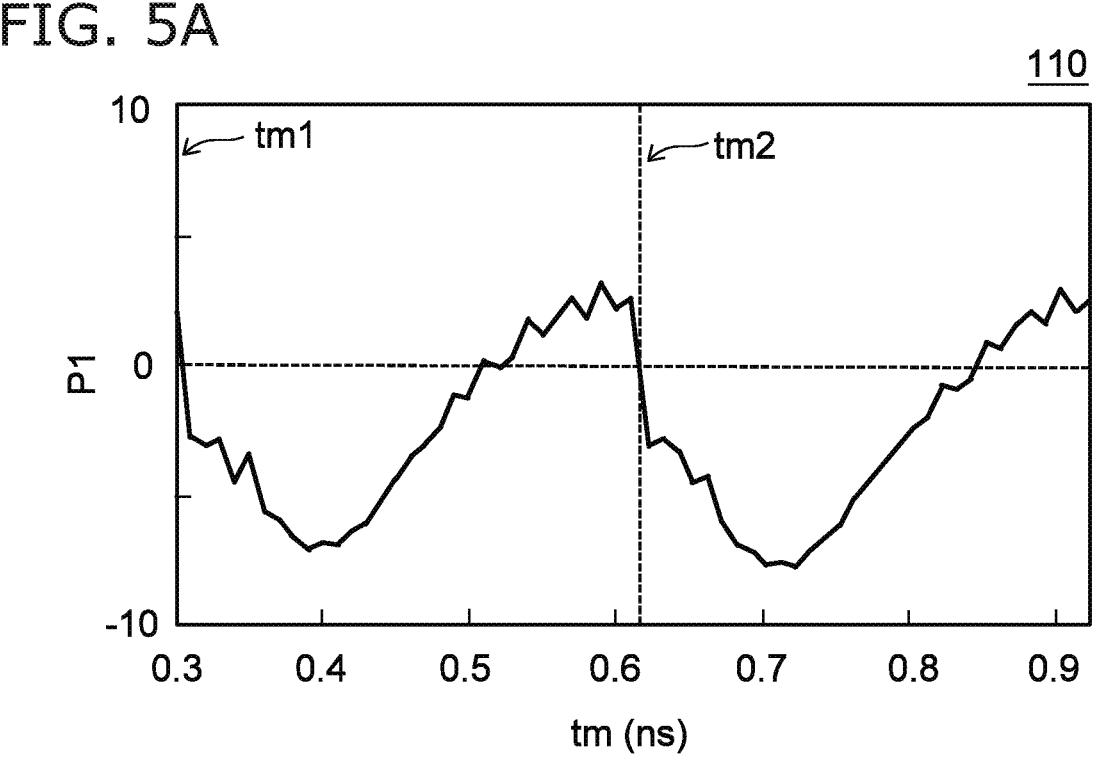
FIGS. 5A and 5B are schematic views illustrating characteristics of magnetic recording devices.
Figure 5B:
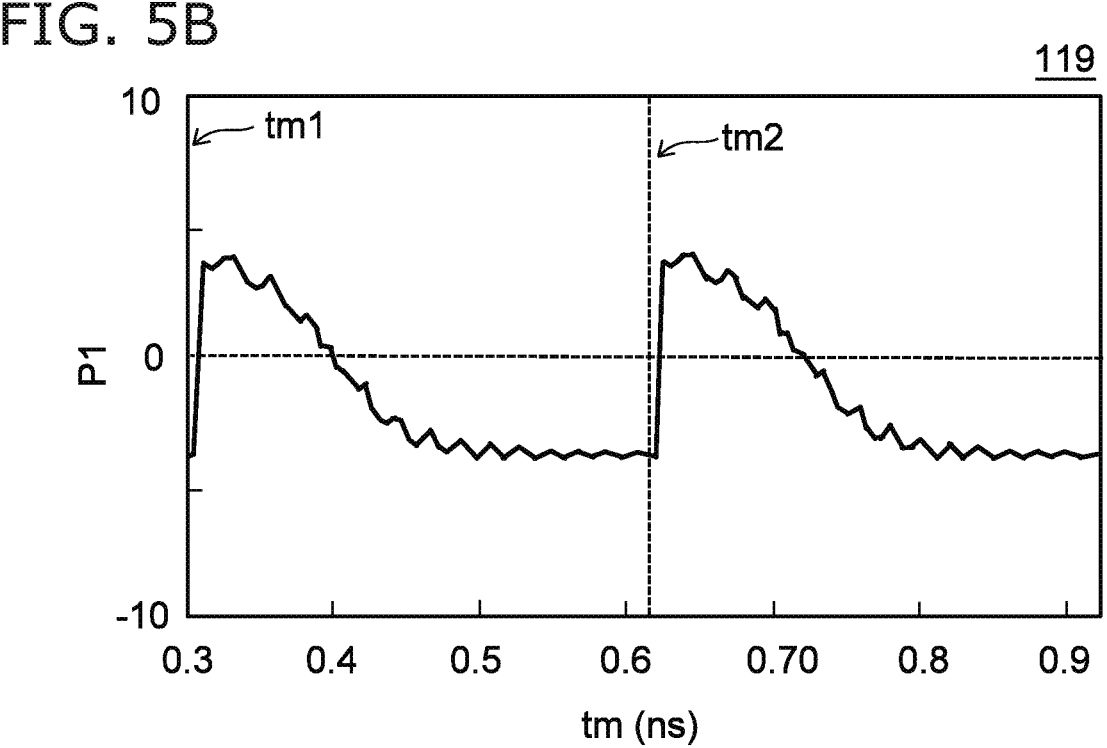

FIGS. 5A and 5B are schematic views illustrating characteristics of magnetic recording devices.

FIG. 5B illustrates simulation results of a characteristic of a magnetic head 119 of a reference example. In the magnetic head 119, the first magnetic layer 21 is provided, but the second magnetic layer 22 and the third nonmagnetic layer 43 are not provided. In the magnetic head 119, the first nonmagnetic layer 41 contacts the magnetic pole 30. In the magnetic head 119, the magnetic thickness (the product of the thickness and the saturation magnetization) of the first magnetic layer 21 is 4 nmT. In the magnetic head 119, the magnetization of the first magnetic layer 21 is reversed by supplying a large current (the second current i2) to the stacked body. FIG. 5B illustrates the results of a simulation of the change of the orientation of the magnetization of the first magnetic layer 21 when the recording current Iw is reversed while supplying such a second current i2 to the stacked body.

FIG. 5A illustrates simulation results of a characteristic of the magnetic head 110 according to the embodiment. FIG. 5A illustrates the results of a simulation of the response of the magnetization of the total of the first and second magnetic layers 21 and 22 when the recording current Iw is reversed while supplying the second current i2 described above to the stacked body 20.

In FIGS. 5A and 5B, the horizontal axis is the time tm. The polarity of the recording current Iw reverses at a first time tm1 and a second time tm2. In FIGS. 5A and 5B, the vertical axis is a parameter P1 corresponding to the reversal amount of the magnetization. The parameter P1 corresponds to the inner product of the orientation of an external magnetic field and the Mst (the product of the saturation magnetization and the thickness) of the first magnetic layer 21. When the parameter P1 is positive, the orientation of the magnetization of the first magnetic layer 21 is the same as the orientation of the magnetization of the magnetic pole 30. When the parameter P1 is negative, the orientation of the magnetization of the first magnetic layer 21 is the reverse of the orientation of the magnetization of the magnetic pole 30. When the parameter P1 is negative, the recording magnetic field that is emitted from the magnetic pole 30 does not easily pass through the first magnetic layer 21, and the recording magnetic field that is applied to the magnetic recording medium 80 increases. The state in which the parameter P1 is negative corresponds to a favorable state. When the parameter P1 is negative, the gain is increased when referenced to when a current is not supplied to the stacked body 20.

In the magnetic head 119 as shown in FIG. 5B, the parameter P1 is positive directly after the time at which the polarity of the recording magnetic field reverses (the first time tm1 or the second time tm2), and the parameter P1 becomes negative over time. In the magnetic head 119, for example, an effect is obtained in which the recording magnetic field increases after not less than about 0.2 ns from the time of the polarity reversal of the recording magnetic field. In the magnetic head 119, an increase of the gain is obtained when the frequency of the recording magnetic field is low and the time tm after the polarity reversal is long. In the magnetic head 119, it is difficult to obtain the desired gain because the positive parameter P1 is applied when the frequency of the recording magnetic field is high.

In the magnetic head 110 according to the embodiment as shown in FIG. 5A, the parameter P1 is negative directly after the time at which the polarity of the recording magnetic field reverses (the first time tm1 or the second time tm2), and the parameter P1 becomes positive over time. In the magnetic head 110, an increase of the gain is obtained when the frequency of the recording magnetic field is high and the time tm after the polarity reversal is short.

In the embodiment, the gain that is obtained increases as the frequency of the recording magnetic field increases.

Figure 6:
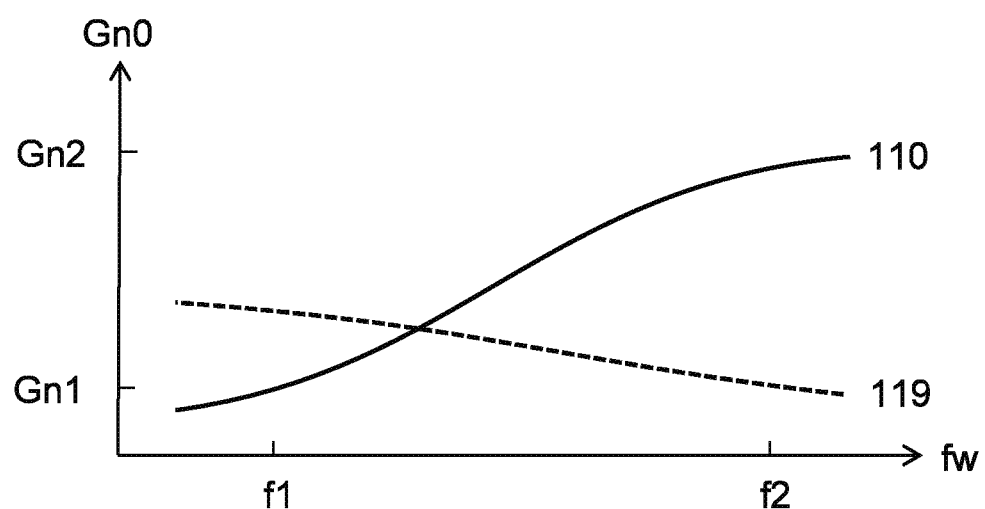
FIG. 6 is a schematic view illustrating characteristics of the magnetic recording devices.

FIG. 6 is a schematic view illustrating characteristics of the magnetic recording devices.

FIG. 6 illustrates the relationship between the gain and the frequency of the recording magnetic field for the magnetic head 110 according to the embodiment and the magnetic head 119 of the reference example. The horizontal axis of FIG. 6 is a frequency fw of the recording magnetic field. The frequency fw corresponds to the frequency of the recording current Iw. The vertical axis of FIG. 6 is a gain Gn0 referenced to when a current is not supplied to the stacked body 20.

In the magnetic head 110 as shown in FIG. 6, the gain Gn0 increases as the frequency fw increases. In the magnetic head 119, the gain Gn0 decreases as the frequency fw increases.

As shown in FIG. 6, the gain Gn0 when the frequency fw is a first frequency f1 is taken as a first gain Gn1. The gain Gn0 when the frequency fw is a second frequency f2 is taken as a second gain Gn2. The first gain Gn1 corresponds to the ratio of a first intensity to a second intensity. The first intensity corresponds to the reproducing intensity of the signal recorded in the magnetic recording medium 80 when the electrical circuit 20D does not supply the second current i2 to the stacked body 20 in the recording operation when the recording current Iw corresponding to the information to be recorded has the first frequency f1. The second intensity corresponds to the reproducing intensity of the signal recorded in the magnetic recording medium 80 when the electrical circuit 20D supplies the second current i2 to the stacked body 20 in the recording operation when the recording current Iw has the first frequency f1.

The second gain Gn2 corresponds to the ratio of a third intensity to a fourth intensity. The third intensity corresponds to the reproducing intensity of the signal recorded in the magnetic recording medium 80 when the electrical circuit 20D does not supply the second current i2 to the stacked body 20 in the recording operation when the recording current Iw corresponding to the information to be recorded has the second frequency f2, which is greater than the first frequency f1. The fourth intensity corresponds to the reproducing intensity of the signal recorded in the magnetic recording medium 80 when the electrical circuit 20D supplies the second current i2 to the stacked body 20 in the recording operation when the recording current Iw has the second frequency f2.

In the embodiment, the second gain Gn2 (i.e., the second ratio of the fourth intensity to the third intensity) is greater than the first gain Gn1 (i.e., the first ratio of the second intensity to the first intensity).

In the embodiment, a high recording capacity can be obtained in a high-speed recording operation at a high frequency. The recording density can be more effectively improved.

Figure 7A:
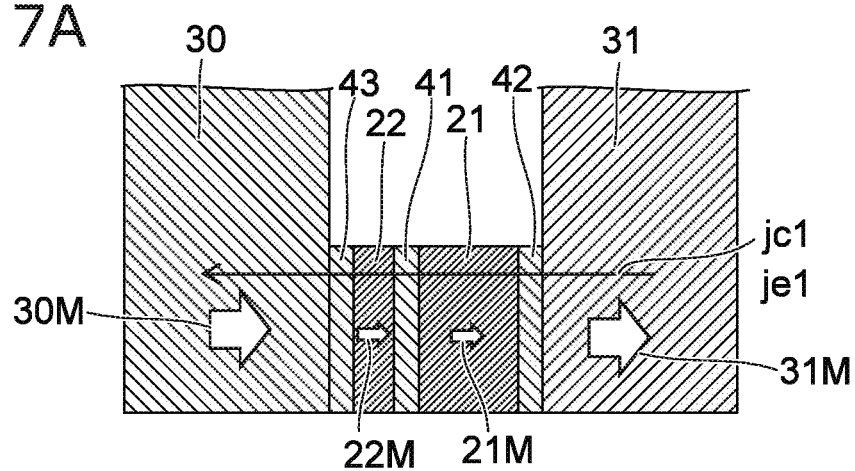
FIGS. 7A to 7C are schematic cross-sectional views illustrating characteristics of the magnetic recording device according to the embodiment.
Figure 7B:
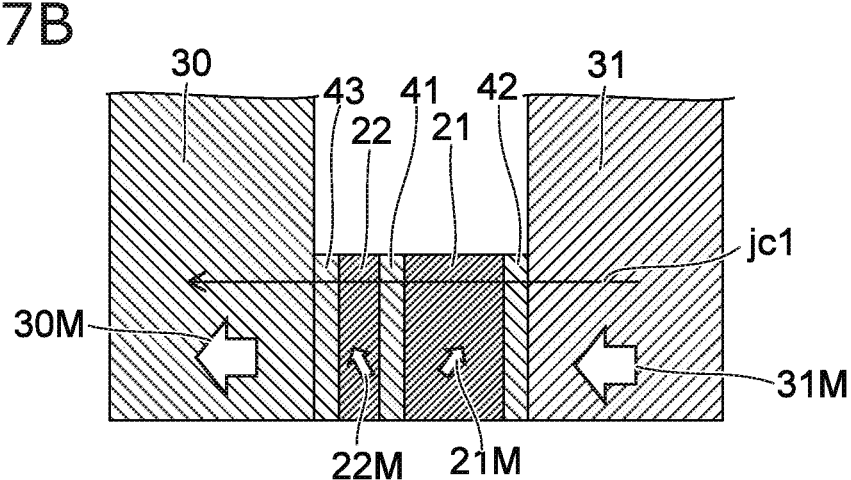
Figure 7C:
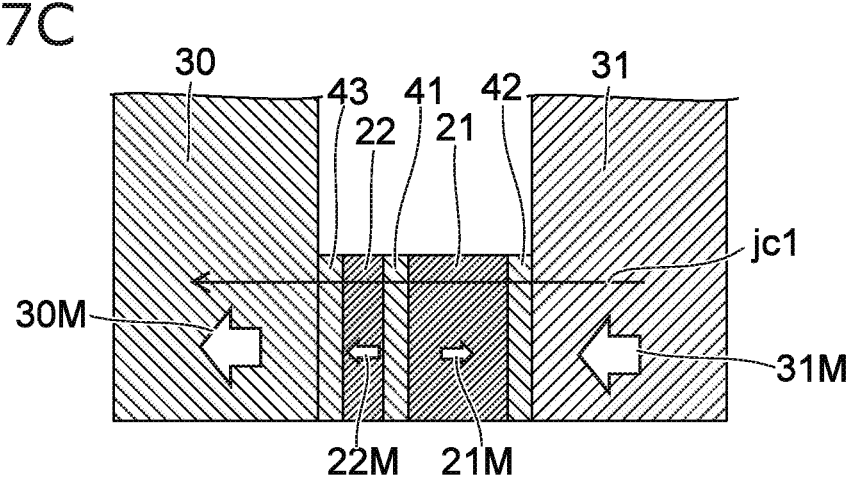

FIGS. 7A to 7C are schematic cross-sectional views illustrating characteristics of the magnetic recording device according to the embodiment.

In one example as shown in FIG. 7A, the orientation of a magnetization 30M of the magnetic pole 30 and the orientation of a magnetization 31M of the first shield 31 are one orientation (in the example, the rightward orientation). The orientation of a magnetization 21M of the first magnetic layer 21 and the orientation of a magnetization 22M of the second magnetic layer 22 are the one orientation (the rightward orientation).

As shown in FIG. 7B, for example, the orientation of the magnetization 30M of the magnetic pole 30 and the orientation of the magnetization 31M of the first shield 31 are reversed to another orientation (in the example, the leftward orientation) according to the change of the information to be recorded. The orientation of the magnetization 21M of the first magnetic layer 21 and the orientation of the magnetization 22M of the second magnetic layer 22 rotate to be the reverse of each other at an intermediate stage when reversing the magnetization 30M and the magnetization 31M.

Then, as shown in FIG. 7C, the orientation of the magnetization 21M of the first magnetic layer 21 is the rightward orientation and the orientation of the magnetization 22M of the second magnetic layer 22 is the leftward orientation in the steady state when the magnetization 30M and the magnetization 31M are reversed.

Figure 8:
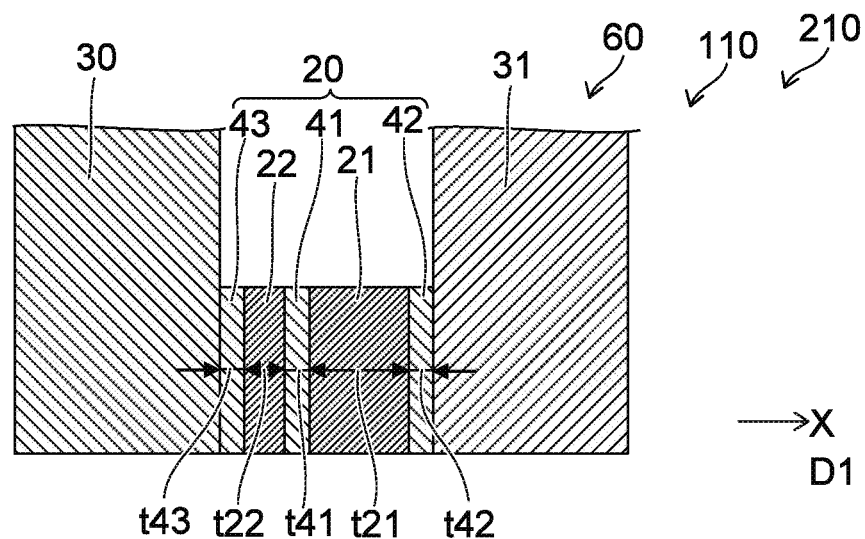
FIG. 8 is a schematic cross-sectional view illustrating a portion of the magnetic recording device according to the embodiment.

FIG. 8 is a schematic cross-sectional view illustrating a portion of the magnetic recording device according to the embodiment.

FIG. 8 illustrates the magnetic head 110.

As shown in FIG. 8, the first magnetic layer 21 has a thickness t21. The second magnetic layer 22 has a thickness t22. The first nonmagnetic layer 41 has a thickness t41. The second nonmagnetic layer 42 has a thickness t42. The third nonmagnetic layer 43 has a thickness t43. These thicknesses are lengths along the first direction D1. As described above, the first direction D1 may be tilted with respect to the X-axis direction.

In the embodiment, the thickness t21 of the first magnetic layer 21 is, for example, not less than 2 nm and not more than 8 nm. By setting the thickness t21 to be 2 nm or more, for example, the magnetic field that is oriented toward the magnetic recording medium 80 can be effectively increased. By setting the thickness t21 to be 8 nm or less, for example, an efficient magnetization reversal is easily obtained.

The thickness t22 of the second magnetic layer 22 is, for example, not less than 2 nm and not more than 4 nm. By setting the thickness t22 to be 2 nm or more, a higher gain is easily obtained in a high-speed operation. By setting the thickness t22 to be 4 nm or less, a stable operation is easily obtained.

For example, polarized spin can be effectively transmitted by appropriately setting the thickness t42 of the second nonmagnetic layer 42. In the embodiment, the thickness t42 is, for example, not less than 2 nm and not more than 5 nm. The thickness t42 may be set according to the material of the second nonmagnetic layer 42, etc.

For example, polarized spin can be effectively attenuated by appropriately setting the thickness t43 of the third nonmagnetic layer 43. In the embodiment, the thickness t41 is, for example, not less than 2 nm and not more than 6 nm. The thickness t41 may be set according to the material of the third nonmagnetic layer 43, etc.

When the first nonmagnetic layer 41 includes the first material (at least one selected from the group consisting of Cu, Ag, Au, Al, and Cr), the thickness t41 of the first nonmagnetic layer 41 is, for example, not less than 1 nm and not more than 5 nm. By appropriately setting the first material and the thickness t41 of the first nonmagnetic layer 41, for example, the gain of a high-speed operation can be increased.

When the first nonmagnetic layer 41 includes the second material (at least one selected from the group consisting of Ta, Pt, W, Mo, Ir, Ru, Tb, Rh, and Pd), the thickness t41 of the first nonmagnetic layer 41 is, for example, not less than 1 nm and not more than 5 nm. By appropriately setting the second material and the thickness t41 of the first nonmagnetic layer 41, for example, the gain of a high-speed operation can be increased.

The first magnetic layer 21 and the second magnetic layer 22 include, for example, a magnetic material that has a positive polarization. The first magnetic layer 21 and the second magnetic layer 22 include at least one of Fe, Co, or Ni.

Second Embodiment

Figure 9:
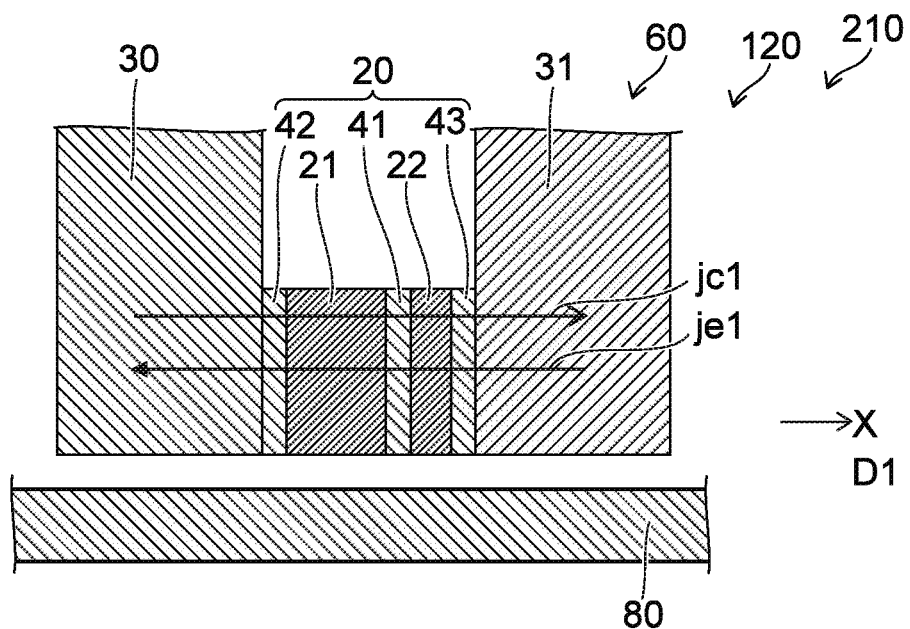
FIG. 9 is a schematic cross-sectional view illustrating a portion of a magnetic recording device according to a second embodiment.

FIG. 9 is a schematic cross-sectional view illustrating a portion of a magnetic recording device according to a second embodiment.

As shown in FIG. 9, the magnetic recording device 210 in the second embodiment includes a magnetic head 120, the magnetic recording medium 80, and the electrical circuit 20D (referring to FIG. 2).

The magnetic head 120 includes the magnetic pole 30, the first shield 31, and the stacked body 20. The stacked body 20 is provided between the magnetic pole 30 and the first shield 31. The stacked body 20 includes the first magnetic layer 21, the second magnetic layer 22, the first nonmagnetic layer 41, the second nonmagnetic layer 42, and the third nonmagnetic layer 43.

The second magnetic layer 22 is provided between the first magnetic layer 21 and the first shield 31. The first nonmagnetic layer 41 is provided between the first magnetic layer 21 and the second magnetic layer 22. The second nonmagnetic layer 42 is provided between the magnetic pole 30 and the first magnetic layer 21. The third nonmagnetic layer 43 is provided between the second magnetic layer 22 and the first shield 31.

The second nonmagnetic layer 42 includes at least one selected from the group consisting of Cu, Ag, Au, Al, and Cr. The third nonmagnetic layer 43 includes at least one selected from the group consisting of Ta, Pt, W, Mo, Ir, Ru, Tb, Rh, Cr, and Pd.

In the second embodiment as shown in FIG. 9, the current jc1 that is supplied to the stacked body 20 from the electrical circuit 20D (referring to FIG. 2) has an orientation from the magnetic pole 30 toward the first shield 31. The current jc1 has an orientation from the first magnetic layer 21 toward the second magnetic layer 22. The electron current je1 has an orientation from the first shield 31 toward the magnetic pole 30.

Similarly to the first embodiment, the electrical resistance Rx2 of the stacked body 20 is the first resistance R1 when the current jc1 flowing in the stacked body 20 is the first current i1 (referring to FIG. 3B). The electrical resistance Rx2 of the stacked body 20 is the second resistance R2, which is greater than the first resistance R1, when the current jc1 flowing in the stacked body 20 is the second current i2, which is greater than the first current i1. The electrical resistance Rx2 of the stacked body 20 oscillates when the current jc1 flowing in the stacked body 20 is the third current i3, which is between the first current i1 and the second current i2 (referring to FIG. 4B).

The electrical circuit 20D is configured to supply the second current i2 to the stacked body 20 in the recording operation of using the magnetic head 120 to record the information in the magnetic recording medium 80.

In the magnetic recording device 210 including the magnetic head 120 as well, a magnetic recording device is provided in which the recording density can be increased.

The configurations, the materials, and the thicknesses described in reference to the magnetic head 110 are applicable to the magnetic head 120. For example, the first nonmagnetic layer 41 may include the first material or the second material. The first material includes at least one selected from the group consisting of Cu, Ag, Au, Al, and Cr. The second material includes at least one selected from the group consisting of Ta, Pt, W, Mo, Ir, Ru, Tb, Rh, and Pd. The thickness of the first nonmagnetic layer is, for example, not less than 1 nm and not more than 5 nm. The thickness of the second nonmagnetic layer 42 is, for example, not less than 1 nm and not more than 5 nm. The thickness of the third nonmagnetic layer 43 is, for example, not less than 2 nm and not more than 6 nm. The first magnetic layer 21 and the second magnetic layer 22 include, for example, at least one of Fe or Co. For example, the first magnetic layer 21 and the second magnetic layer 22 include a material having a positive polarization. The thickness of the first magnetic layer 21 is, for example, not less than 2 nm and not more than 8 nm. The thickness of the second magnetic layer 22 is not less than 2 nm and not more than 4 nm.

An example of the magnetic head and the magnetic recording medium 80 included in the magnetic recording device 210 according to the embodiment will now be described.

Figure 10:
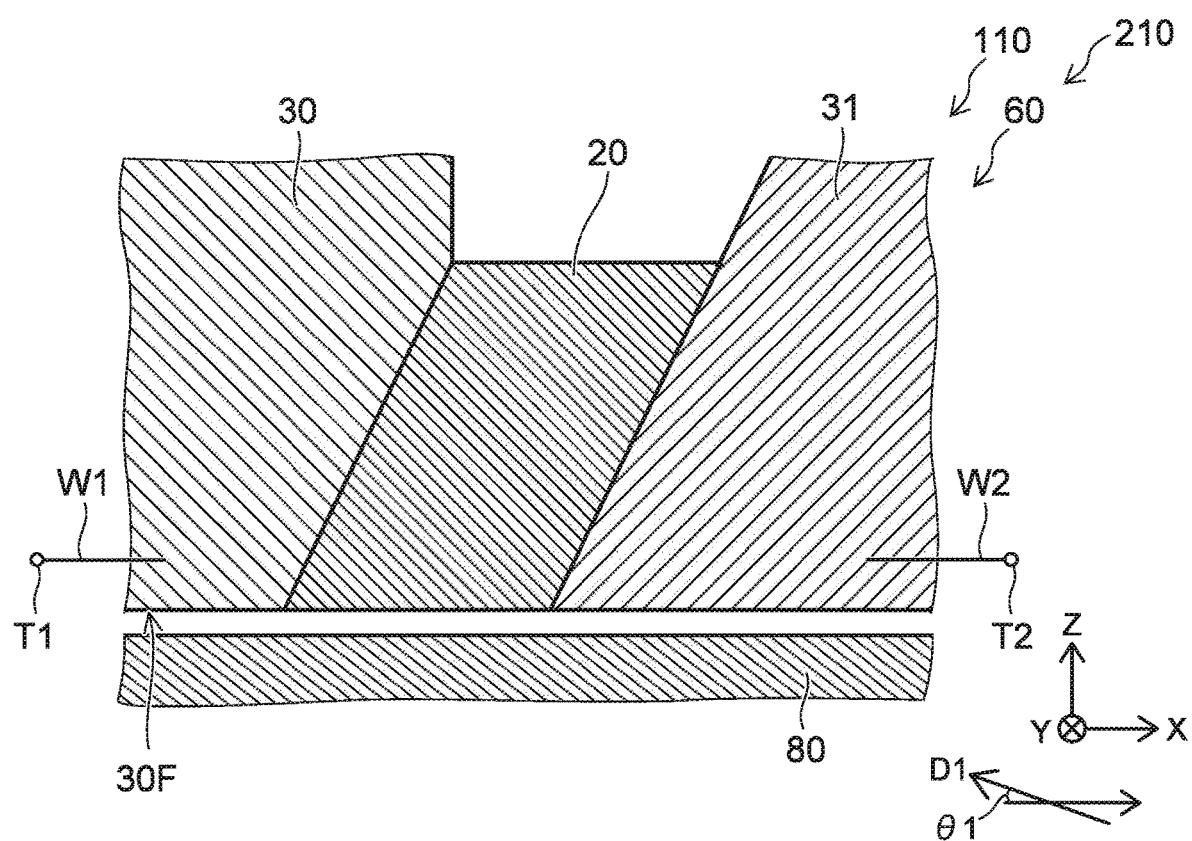
FIG. 10 is a schematic cross-sectional view illustrating the magnetic head according to the embodiment.

FIG. 10 is a schematic cross-sectional view illustrating the magnetic head according to the embodiment.

In the magnetic head (e.g., the magnetic head 110) according to the embodiment as shown in FIG. 10, the first direction D1 from the first shield 31 toward the magnetic pole 30 may be tilted with respect to the X-axis direction.

The first direction D1 corresponds to the stacking direction of the stacked body 20. The X-axis direction is along the medium-facing surface 30F of the magnetic pole 30. The angle between the first direction D1 and the medium-facing surface 30F is taken as an angle θ1. The angle θ1 is, for example, not less than 15 degrees and not more than 30 degrees. The angle θ1 may be 0 degrees.

When the first direction D1 is tilted with respect to the X-axis direction, the thicknesses of the layers correspond to lengths along the first direction D1. The configuration in which the first direction D1 is tilted with respect to the X-axis direction is applicable to any magnetic head according to the first or second embodiment.

Figure 11:
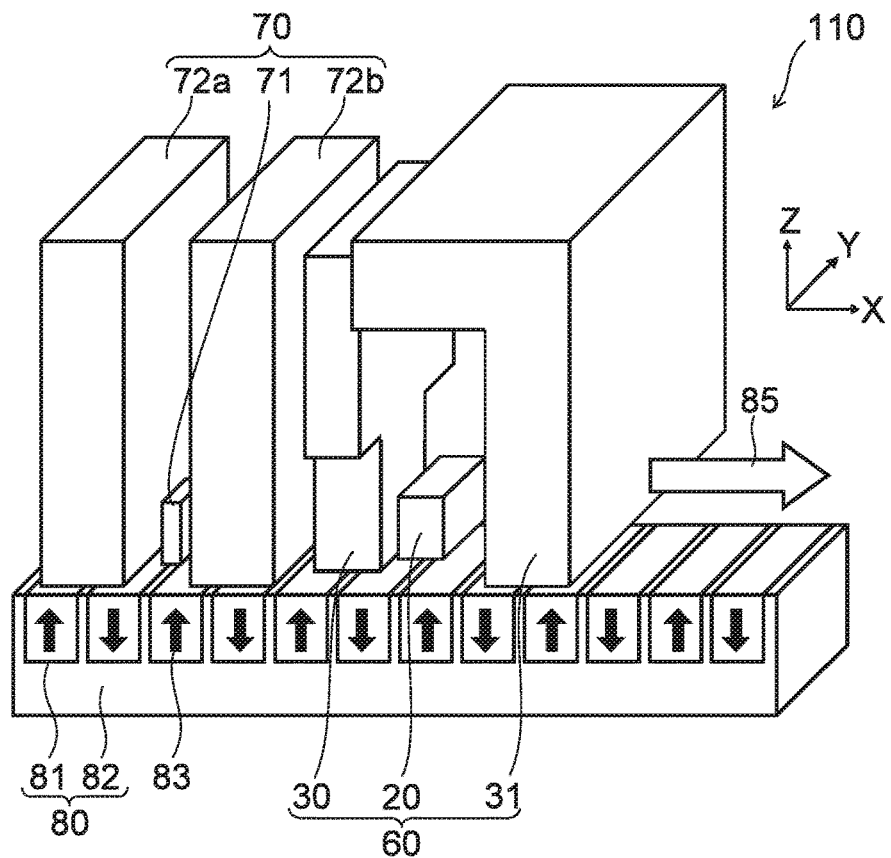
FIG. 11 is a schematic perspective view illustrating the magnetic recording device according to the embodiment.

FIG. 11 is a schematic perspective view illustrating the magnetic recording device according to the embodiment.

As shown in FIG. 11, the magnetic head 110 according to the embodiment is used with the magnetic recording medium 80. In the example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproducing magnetic first shield 72a, a second reproducing magnetic first shield 72b, and a magnetic reproducing element 71. The magnetic reproducing element 71 is provided between the first reproducing magnetic first shield 72a and the second reproducing magnetic first shield 72b. The magnetic reproducing element 71 can output a signal corresponding to the magnetization 83 of the magnetic recording layer 81.

As shown in FIG. 11, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Figure 12:
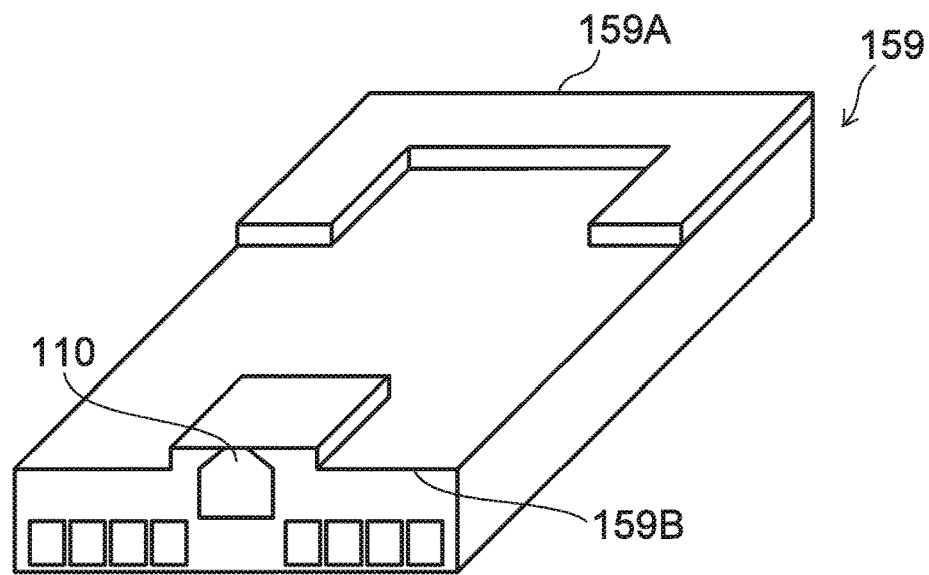
FIG. 12 is a schematic perspective view illustrating a portion of the magnetic recording device according to the embodiment.

FIG. 12 is a schematic perspective view illustrating a portion of the magnetic recording device according to the embodiment.

FIG. 12 illustrates a head slider. The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 13:
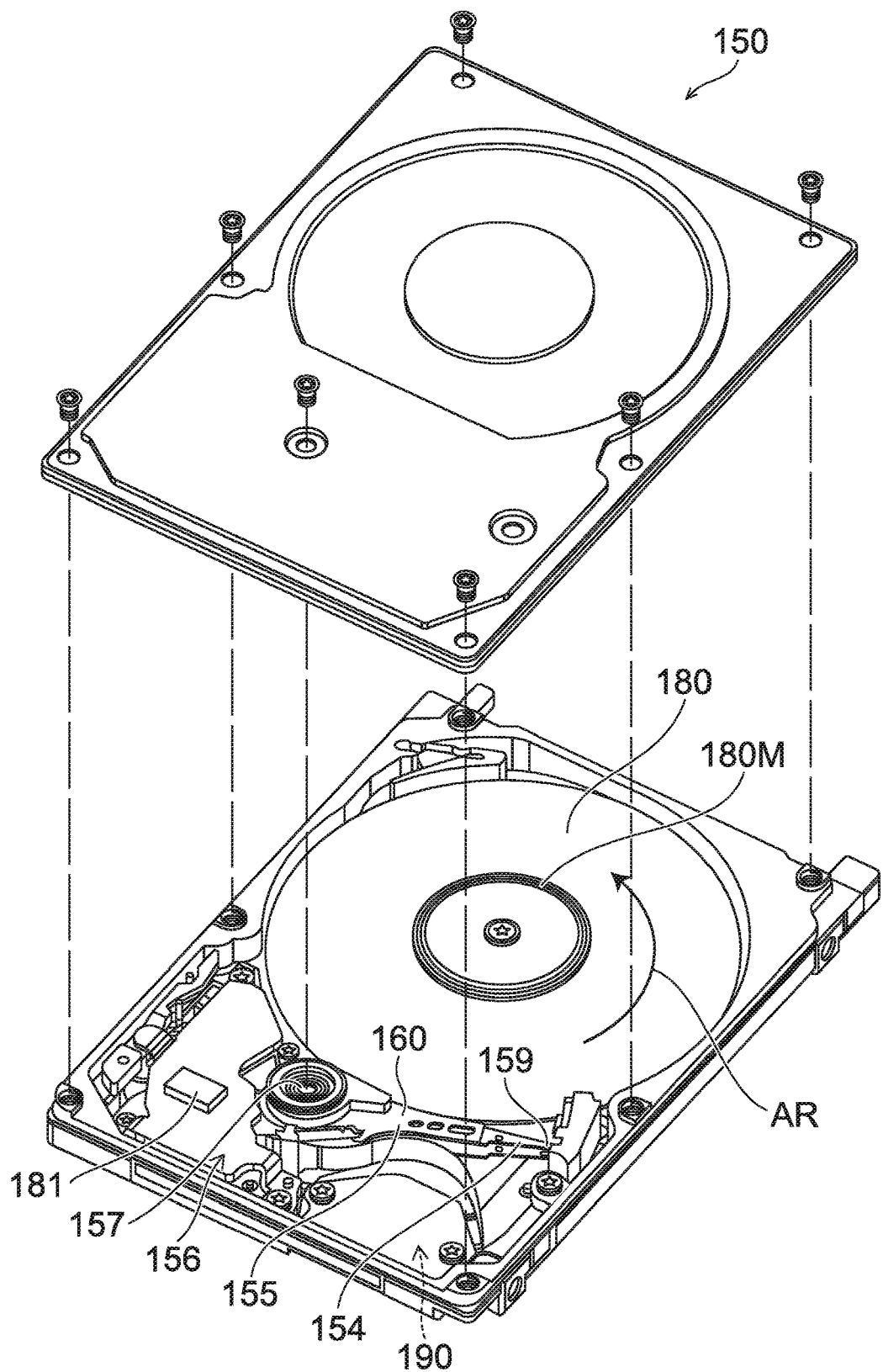
FIG. 13 is a schematic perspective view illustrating a magnetic recording device according to the embodiment.

FIG. 13 is a schematic perspective view illustrating a magnetic recording device according to the embodiment.

Figure 14A:
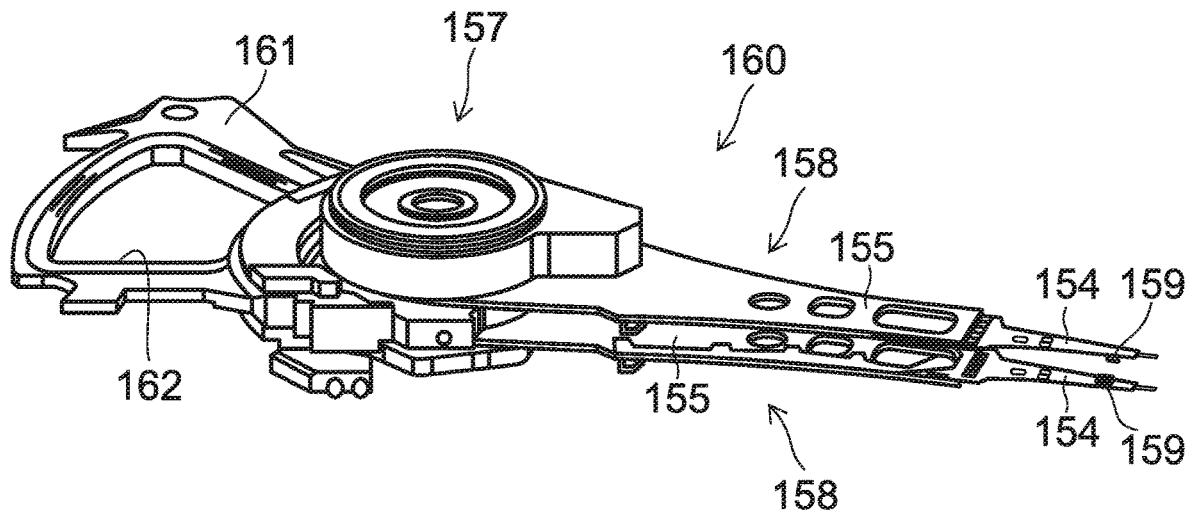
FIGS. 14A and 14B are schematic perspective views illustrating a portion of the magnetic recording device according to the embodiment.
Figure 14B:
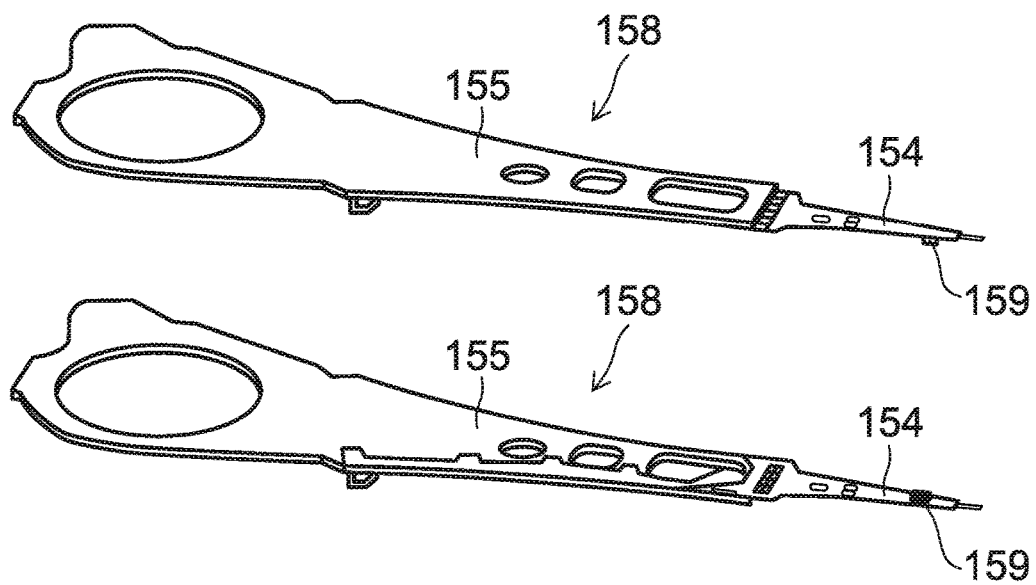

FIGS. 14A and 14B are schematic perspective views illustrating a portion of the magnetic recording device according to the embodiment.

As shown in FIG. 13, a rotary actuator is used in the magnetic recording device 150 according to the embodiment. A recording medium disk 180 is mounted to a spindle motor 180M. The recording medium disk 180 rotates in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 14A illustrates the configuration of a portion of the magnetic recording device and is an enlarged perspective view of a head stack assembly 160.

FIG. 14B is a perspective view illustrating a magnetic head assembly (a head gimbal assembly (HGA)) 158 that is a portion of the head stack assembly 160.

As shown in FIG. 14A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 14B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

The embodiments may include the following configurations (e.g., technological proposals).

Configuration 1

A magnetic recording device, comprising:
   a magnetic head;
   a magnetic recording medium; and
   an electrical circuit,
   the magnetic head including
   a magnetic pole,
   a first shield, and
   a stacked body provided between the magnetic pole and the first shield,
   the stacked body including
   a first magnetic layer,
   a second magnetic layer provided between the magnetic pole and the first magnetic layer,
   a first nonmagnetic layer provided between the second magnetic layer and the first magnetic layer,
   a second nonmagnetic layer provided between the first magnetic layer and the first shield, and
   a third nonmagnetic layer provided between the magnetic pole and the second magnetic layer,
   the second nonmagnetic layer including at least one selected from the group consisting of Cu, Ag, Au, Al, and Cr,
   the third nonmagnetic layer including at least one selected from the group consisting of Ta, Pt, W, Mo, Ir, Ru, Tb, Rh, Cr, and Pd, an electrical resistance of the stacked body being a first resistance when a current flowing in the stacked body is a first current, the electrical resistance of the stacked body being a second resistance when the current flowing in the stacked body is a second current, the second current being greater than the first current, the second resistance being greater than the first resistance, the electrical resistance of the stacked body oscillating when the current flowing in the stacked body is a third current, the third current being between the first current and the second current, the electrical circuit being configured to supply the second current to the stacked body in a recording operation of using the magnetic head to record information in the magnetic recording medium.

Configuration 2

The magnetic recording device according to Configuration 1, wherein the second current has an orientation from the first magnetic layer toward the second magnetic layer.

Configuration 3

A magnetic recording device, comprising:
a magnetic head;
a magnetic recording medium; and
an electrical circuit,
the magnetic head including
a magnetic pole,
a first shield, and
a stacked body provided between the magnetic pole and the first shield,
the stacked body including
a first magnetic layer,
a second magnetic layer provided between the first magnetic layer and the first shield,
a first nonmagnetic layer provided between the first magnetic layer and the second magnetic layer,
a second nonmagnetic layer provided between the magnetic pole and the first magnetic layer, and
a third nonmagnetic layer provided between the second magnetic layer and the first shield,
the second nonmagnetic layer including at least one selected from the group consisting of Cu, Ag, Au, Al, and Cr,
the third nonmagnetic layer including at least one selected from the group consisting of Ta, Pt, W, Mo, Ir, Ru, Tb, Rh, Cr, and Pd, an electrical resistance of the stacked body being a first resistance when a current flowing in the stacked body is a first current, the electrical resistance of the stacked body being a second resistance when the current flowing in the stacked body is a second current, the second current being greater than the first current, the second resistance being greater than the first resistance, the electrical resistance of the stacked body oscillating when the current flowing in the stacked body is a third current, the third current being between the first current and the second current, the electrical circuit being configured to supply the second current to the stacked body in a recording operation of using the magnetic head to record information in the magnetic recording medium.

Configuration 4

The magnetic recording device according to Configuration 3, wherein the second current has an orientation from the first magnetic layer toward the second magnetic layer.

Configuration 5

The magnetic recording device according to any one of Configurations 1 to 4, wherein the first nonmagnetic layer includes a first material or a second material, the first material includes at least one selected from the group consisting of Cu, Ag, Au, Al, and Cr, and the second material includes at least one selected from the group consisting of Ta, Pt, W, Mo, Ir, Ru, Tb, Rh, and Pd.

Configuration 6

The magnetic recording device according to Configuration 5, wherein the first nonmagnetic layer includes the first material, and a thickness of the first nonmagnetic layer is not less than 1 nm and not more than 5 nm.

Configuration 7

The magnetic recording device according to Configuration 5, wherein the first nonmagnetic layer includes the second material, and a thickness of the first nonmagnetic layer is not less than 1 nm and not more than 5 nm.

Configuration 8

The magnetic recording device according to any one of Configurations 1 to 7, wherein a thickness of the second nonmagnetic layer is not less than 1 nm and not more than 5 nm.

Configuration 9

The magnetic recording device according to any one of Configurations 1 to 8, wherein a thickness of the third nonmagnetic layer is not less than 2 nm and not more than 6 nm.

Configuration 10

The magnetic recording device according to any one of Configurations 1 to 9, wherein the first magnetic layer and the second magnetic layer include at least one of Fe or Co.

Configuration 11

The magnetic recording device according to any one of Configurations 1 to 10, wherein the first magnetic layer and the second magnetic layer include a material having a positive polarization.

Configuration 12

The magnetic recording device according to any one of Configurations 1 to 11, wherein a thickness of the first magnetic layer is not less than 2 nm and not more than 8 nm.

Configuration 13

The magnetic recording device according to any one of Configurations 1 to 12, wherein a thickness of the second magnetic layer is not less than 2 nm and not more than 4 nm.

Configuration 14

The magnetic recording device according to any one of Configurations 1 to 13, wherein an intensity of a signal recorded in the magnetic recording medium is a first intensity when the electrical circuit does not supply the second current to the stacked body in the recording operation when a recording current corresponding to the information has a first frequency, the intensity of the signal recorded in the magnetic recording medium is a second intensity when the electrical circuit supplies the second current to the stacked body in the recording operation when the recording current has the first frequency, the intensity of the signal recorded in the magnetic recording medium is a third intensity when the electrical circuit does not supply the second current to the stacked body in the recording operation when the recording current corresponding to the information has a second frequency, the second frequency being greater than the first frequency, the intensity of the signal recorded in the magnetic recording medium is a fourth intensity when the electrical circuit supplies the second current to the stacked body in the recording operation when the recording current has the second frequency, and a second ratio of the fourth intensity to the third intensity is greater than a first ratio of the second intensity to the first intensity.

Configuration 15

The magnetic recording device according to Configuration 14, wherein the magnetic head includes a coil supplied with the recording current.

Third Embodiment

Figure 15:
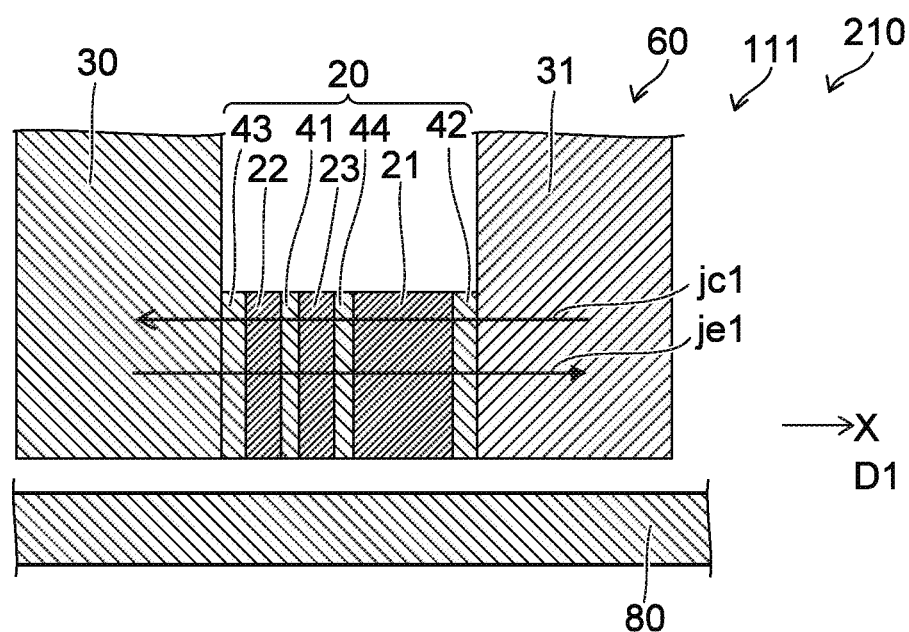
FIG. 15 is a schematic cross-sectional view illustrating a portion of a magnetic recording device according to a third embodiment.

FIG. 15 is a schematic cross-sectional view illustrating a portion of a magnetic recording device according to a third embodiment.

In a magnetic head 111 of the magnetic recording device 210 according to the third embodiment as shown in FIG. 15, the stacked body 20 further includes a third magnetic layer 23 and a fourth nonmagnetic layer 44 in addition to the first magnetic layer 21, the second magnetic layer 22, the first nonmagnetic layer 41, the second nonmagnetic layer 42, and the third nonmagnetic layer 43. Otherwise, the configuration of the magnetic head 111 is similar to the configuration of the magnetic head 110. An example of the magnetic head 111 will now be described.

As shown in FIG. 15, the third magnetic layer 23 is provided between the first nonmagnetic layer 41 and the first magnetic layer 21. The fourth nonmagnetic layer 44 is provided between the third magnetic layer 23 and the first magnetic layer 21. The third magnetic layer 23 includes a first element that includes at least one of Fe, Co, or Ni, and a second element that includes at least one selected from the group consisting of Cr, V, Mn, Ti, and Sc. For example, the third magnetic layer 23 has a positive polarization.

The first magnetic layer 21 and the second magnetic layer 22 include, for example, at least one of Fe, Co, or Ni. For example, a magnetic material that has a positive polarization is included. For example, the first magnetic layer 21 and the second magnetic layer 22 do not include the second element. Or, the concentrations of the second element included in the first and second magnetic layers 21 and 22 are less than the concentration of the second element included in the third magnetic layer 23.

In the magnetic head 111, for example, the first nonmagnetic layer 41 includes at least one selected from the group consisting of Cu, Ag, Au, Al, and Cr. For example, the first nonmagnetic layer 41 functions as a layer that transmits polarized spin.

In the magnetic head 111, for example, the second nonmagnetic layer 42 includes at least one selected from the group consisting of Cu, Ag, Au, Al, and Cr. For example, the second nonmagnetic layer 42 functions as a layer that transmits polarized spin.

In the magnetic head 111, for example, the third nonmagnetic layer 43 includes at least one selected from the group consisting of Ta, Pt, W, Mo, Ir, Ru, Tb, Rh, Cr, and Pd. For example, the third nonmagnetic layer 43 functions as a layer that attenuates polarized spin.

In the magnetic head 111, for example, the fourth nonmagnetic layer 44 includes at least one selected from the group consisting of Ta, Pt, W, Mo, Ir, Ru, Tb, Rh, Cr, and Pd. For example, the fourth nonmagnetic layer 44 functions as a layer that attenuates polarized spin.

A higher gain is obtained in the magnetic head 111 having such a configuration.

Figure 16:
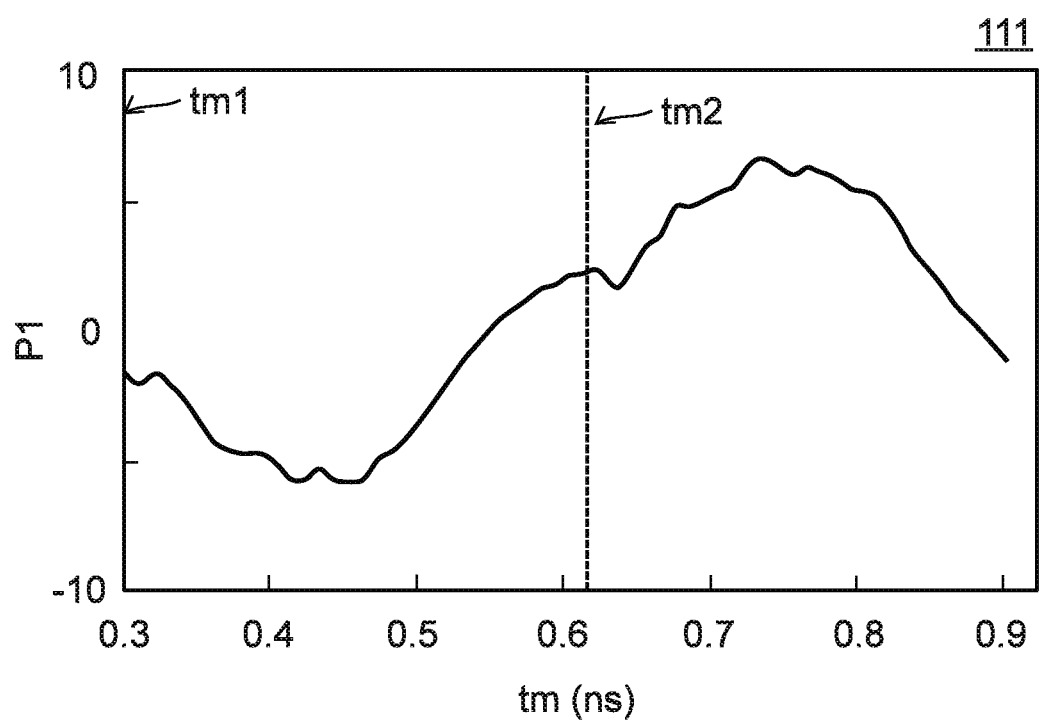
FIG. 16 is a schematic view illustrating a characteristic of the magnetic recording device according to the third embodiment.

FIG. 16 is a schematic view illustrating a characteristic of the magnetic recording device according to the third embodiment.

FIG. 16 illustrate simulation results of a characteristic of the magnetic head 111 according to the third embodiment. The results are illustrated for a simulation of the response of the magnetization of the total of the first magnetic layer 21, the second magnetic layer 22, and the third magnetic layer 23 when the recording current Iw is reversed while supplying the second current i2 to the stacked body 20. The horizontal axis of FIG. 16 is the time tm. The polarity of the recording current Iw reverses at the first and second times tm1 and tm2. The vertical axis of FIG. 16 is the parameter P1 corresponding to the reversal amount of the magnetization. When the parameter P1 is negative, the gain that is referenced to when a current is not supplied to the stacked body 20 increases.

In the magnetic head 111 as shown in FIG. 16, the parameter P1 is negative directly after the time at which the polarity of the recording magnetic field reverses (the first time tm1 or the second time tm2), and the parameter P1 becomes positive over time. In the magnetic head 111, an increase of the gain is obtained when the frequency of the recording magnetic field is high and the time tm after the polarity reversal is short.

In the magnetic head 111 as shown in FIG. 16, the time tm at which the maximum value of the absolute value of the parameter P1 is obtained is 0.45 ns. On the other hand, in the magnetic head 110 illustrated in FIG. 5A, the time tm at which the maximum value of the absolute value of the parameter P1 is obtained is 0.4 ns. The magnetization of the magnetic pole 30 reverses at a time that is slightly after the time at which the polarity of the recording magnetic field reverses (the first time tm1 or the second time tm2). In the magnetic head 111, the reversal time of the magnetization of the first magnetic layer 21 better matches the reversal time of the magnetization of the magnetic pole 30. A higher gain is obtained thereby.

Figure 17:
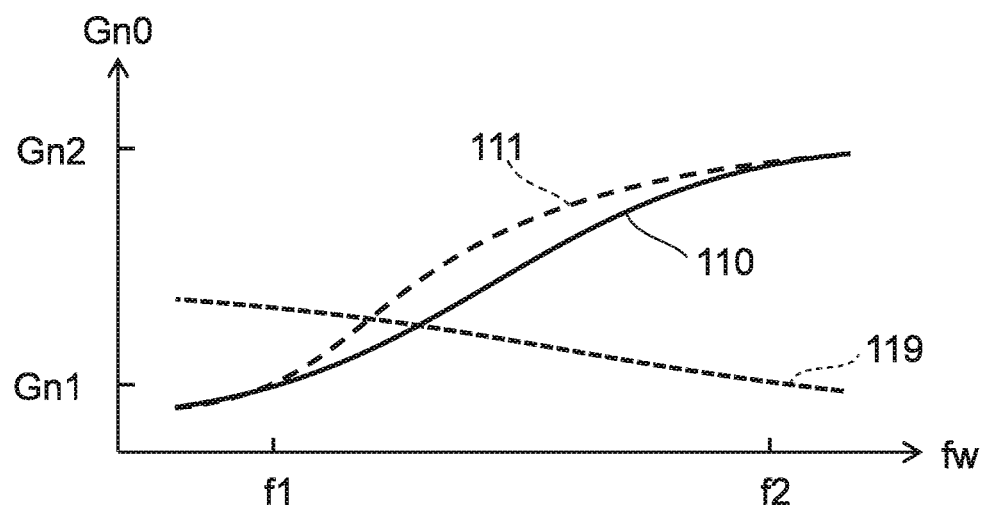
FIG. 17 is a schematic view illustrating characteristics of the magnetic recording devices.

FIG. 17 is a schematic view illustrating characteristics of the magnetic recording devices.

FIG. 17 illustrates the relationship between the gain and the frequency of the recording magnetic field for the magnetic head 111 in addition to the magnetic head 110 and the magnetic head 119. The horizontal axis of FIG. 17 is the frequency fw of the recording magnetic field. The frequency fw corresponds to the frequency of the recording current Iw. The vertical axis of FIG. 17 is the gain Gn0 referenced to when a current is not supplied to the stacked body 20.

As shown in FIG. 17, compared to the magnetic head 110, a high gain Gn0 is obtained at a low frequency fw in the magnetic head 111. In the third embodiment as well, a high recording capacity can be obtained in a high-speed recording operation at a high frequency. The recording density can be more effectively improved.

Figure 18A:
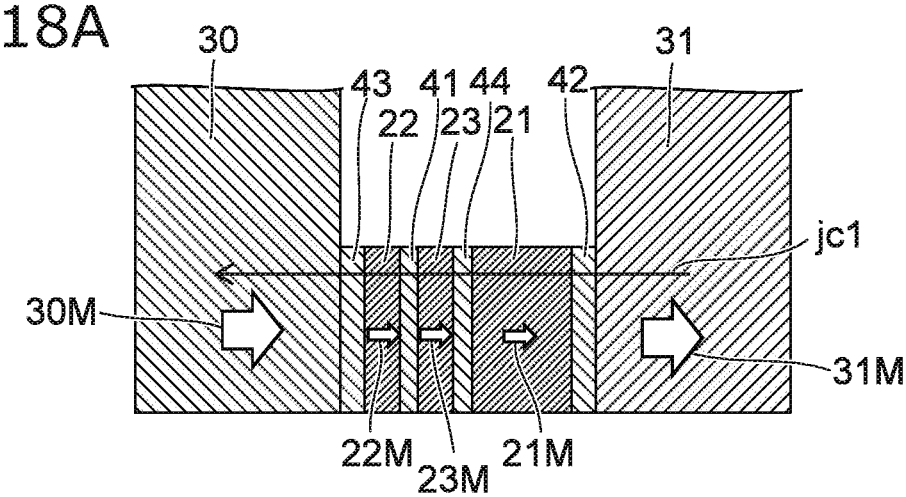
FIGS. 18A to 18C are schematic cross-sectional views illustrating characteristics of the magnetic recording device according to the third embodiment.
Figure 18B:
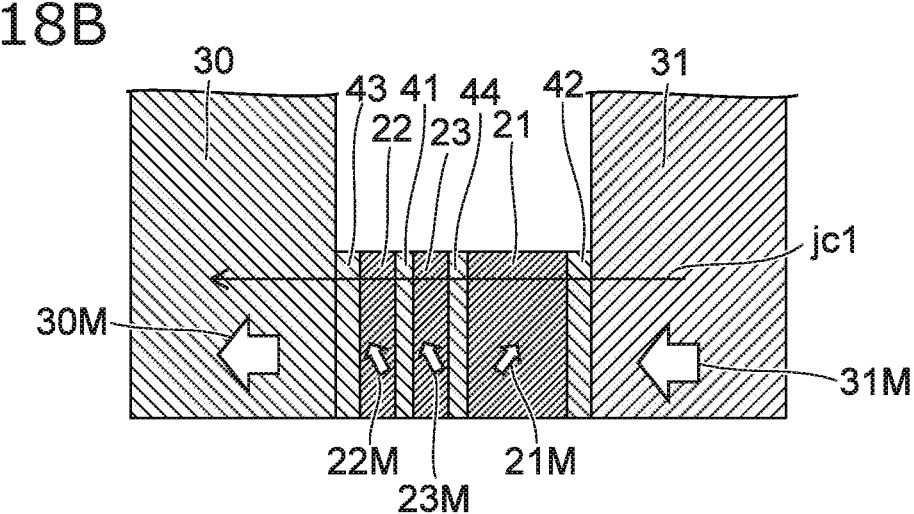
Figure 18C:
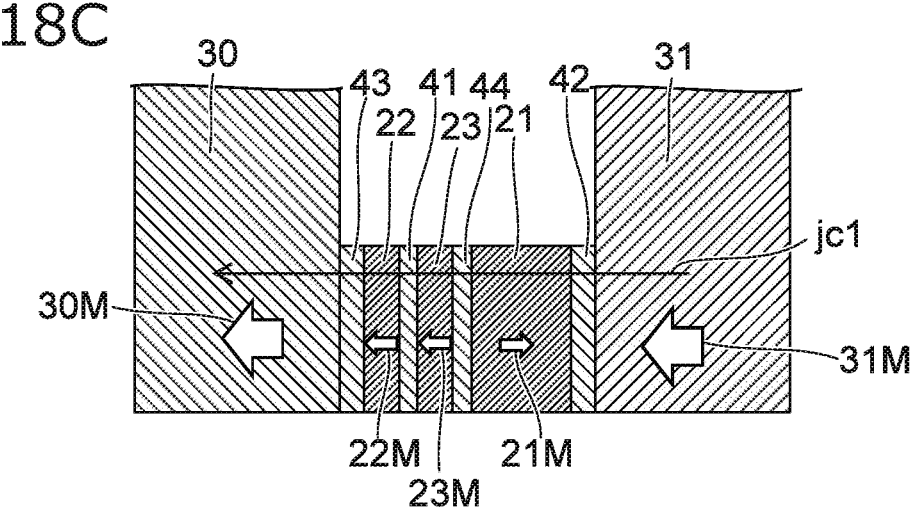

FIGS. 18A to 18C are schematic cross-sectional views illustrating characteristics of the magnetic recording device according to the third embodiment.

These drawings show an example of the changes of the orientations of the magnetizations of the magnetic head 111. As shown in these drawings, for example, a magnetization 23M of the third magnetic layer 23 is interlocked with the magnetization 22M of the second magnetic layer 22.

Fourth Embodiment

Figure 19:
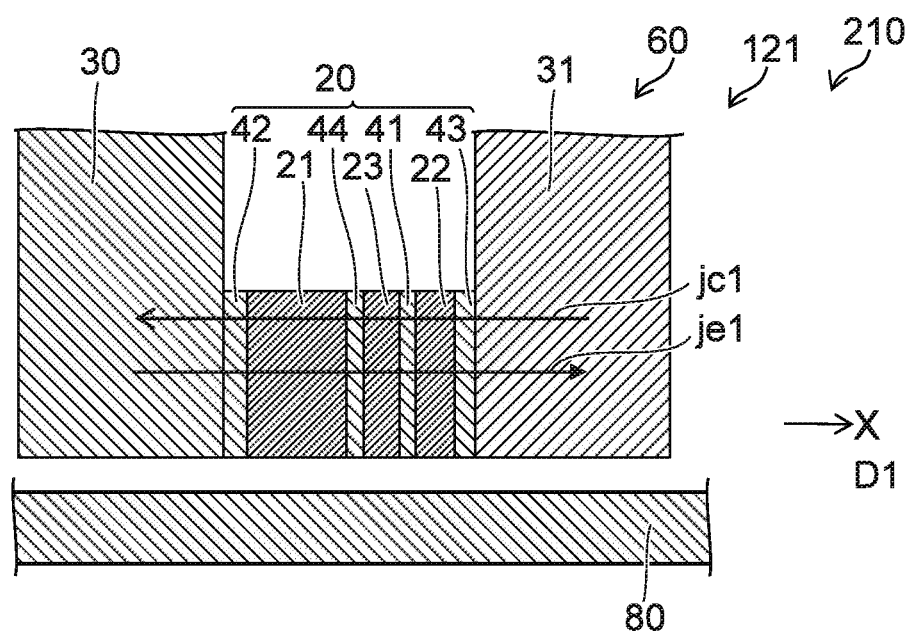
FIG. 19 is a schematic cross-sectional view illustrating a portion of a magnetic recording device according to a fourth embodiment.

FIG. 19 is a schematic cross-sectional view illustrating a portion of a magnetic recording device according to a fourth embodiment.

In a magnetic head 121 of the magnetic recording device 210 according to the fourth embodiment as shown in FIG. 19, the stacked body 20 further includes the third magnetic layer 23 and the fourth nonmagnetic layer 44 in addition to the first magnetic layer 21, the second magnetic layer 22, the first nonmagnetic layer 41, the second nonmagnetic layer 42, and the third nonmagnetic layer 43. Otherwise, the configuration of the magnetic head 121 is similar to the configuration of the magnetic head 120. An example of the magnetic head 121 will now be described.

In the magnetic head 121, the third magnetic layer 23 is provided between the first nonmagnetic layer 41 and the first magnetic layer 21. The fourth nonmagnetic layer 44 is provided between the third magnetic layer 23 and the first magnetic layer 21. The third magnetic layer 23 includes the first element that includes at least one of Fe, Co, or Ni, and the second element that includes at least one selected from the group consisting of Cr, V, Mn, Ti, and Sc.

The first nonmagnetic layer 41 includes at least one selected from the group consisting of Cu, Ag, Au, Al, and Cr. The second nonmagnetic layer 42 includes at least one selected from the group consisting of Cu, Ag, Au, Al, and Cr. The third nonmagnetic layer 43 includes at least one selected from the group consisting of Ta, Pt, W, Mo, Ir, Ru, Tb, Rh, Cr, and Pd. The fourth nonmagnetic layer 44 includes at least one selected from the group consisting of Ta, Pt, W, Mo, Ir, Ru, Tb, Rh, Cr, and Pd.

In the magnetic head 121 having such a configuration as well, a higher gain is obtained.

In the magnetic head 111 and the magnetic head 121, the thickness of the third magnetic layer 23 is, for example, not less than 1 nm and not more than 5 nm. The thickness of the fourth nonmagnetic layer 44 is, for example, not less than 1 nm and not more than 5 nm. These thicknesses are lengths along the first direction D1. As described above, the first direction D1 may be tilted with respect to the X-axis direction.

According to the embodiment, a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic heads, magnetic poles, first shields, stacked bodies, magnetic layers, nonmagnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
  a magnetic head;
  a magnetic recording medium; and
  an electrical circuit,
  the magnetic head including
    a magnetic pole,
    a first shield, and
    a stacked body provided between the magnetic pole and the first shield,
  the stacked body including
    a first magnetic layer,
    a second magnetic layer provided between the magnetic pole and the first magnetic layer,
    a first nonmagnetic layer provided between the second magnetic layer and the first magnetic layer,
    a second nonmagnetic layer provided between the first magnetic layer and the first shield, and
    a third nonmagnetic layer provided between the magnetic pole and the second magnetic layer,
  the second nonmagnetic layer including at least one selected from the group consisting of Cu, Ag, Au, Al, and Cr,
  the third nonmagnetic layer including at least one selected from the group consisting of Ta, Pt, W, Mo, Ir, Ru, Tb, Rh, Cr, and Pd,
  an electrical resistance of the stacked body being a first resistance when a current flowing in the stacked body is a first current,
  the electrical resistance of the stacked body being a second resistance when the current flowing in the stacked body is a second current, the second current being greater than the first current, the second resistance being greater than the first resistance,
  the electrical resistance of the stacked body oscillating when the current flowing in the stacked body is a third current, the third current being between the first current and the second current,
  the electrical circuit being configured to supply the second current to the stacked body in a recording operation of using the magnetic head to record information in the magnetic recording medium.

2. The device according to claim 1, wherein
the second current has an orientation from the first magnetic layer toward the second magnetic layer.
3. The device according to claim 1, wherein
the first nonmagnetic layer includes a first material or a second material,
the first material includes at least one selected from the group consisting of Cu, Ag, Au, Al, and Cr, and
the second material includes at least one selected from the group consisting of Ta, Pt, W, Mo, Ir, Ru, Tb, Rh, and Pd.
4. The device according to claim 3, wherein
the first nonmagnetic layer includes the first material, and
a thickness of the first nonmagnetic layer is not less than 1 nm and not more than 5 nm.
5. The device according to claim 3, wherein
the first nonmagnetic layer includes the second material, and
a thickness of the first nonmagnetic layer is not less than 1 nm and not more than 5 nm.
6. The device according to claim 1, wherein
a thickness of the second nonmagnetic layer is not less than 1 nm and not more than 5 nm.
7. The device according to claim 1, wherein
a thickness of the third nonmagnetic layer is not less than 2 nm and not more than 6 nm.
8. The device according to claim 1, wherein
the first magnetic layer and the second magnetic layer include at least one of Fe or Co.
9. The device according to claim 1, wherein
the first magnetic layer and the second magnetic layer include a material having a positive polarization.
10. The device according to claim 1, wherein
a thickness of the first magnetic layer is not less than 2 nm and not more than 8 nm.
11. The device according to claim 1, wherein
a thickness of the second magnetic layer is not less than 2 nm and not more than 4 nm.
12. The device according to claim 1, wherein
an intensity of a signal recorded in the magnetic recording medium is a first intensity when the electrical circuit does not supply the second current to the stacked body in the recording operation when a recording current corresponding to the information has a first frequency,
the intensity of the signal recorded in the magnetic recording medium is a second intensity when the electrical circuit supplies the second current to the stacked body in the recording operation when the recording current has the first frequency,
the intensity of the signal recorded in the magnetic recording medium is a third intensity when the electrical circuit does not supply the second current to the stacked body in the recording operation when the recording current corresponding to the information has a second frequency, the second frequency being greater than the first frequency,
the intensity of the signal recorded in the magnetic recording medium is a fourth intensity when the electrical circuit supplies the second current to the stacked body in the recording operation when the recording current has the second frequency, and
a second ratio of the fourth intensity to the third intensity is greater than a first ratio of the second intensity to the first intensity.
13. The device according to claim 12, wherein
the magnetic head includes a coil supplied with the recording current.

14. The device according to claim 1, wherein
the stacked body further includes
a third magnetic layer provided between the first nonmagnetic layer and the first magnetic layer, and
a fourth nonmagnetic layer provided between the third magnetic layer and the first nonmagnetic layer,
the third magnetic layer includes a first element that includes at least one of Fe, Co, or Ni, and a second element that includes at least one selected from the group consisting of Cr, V, Mn, Ti, and Sc,
the first nonmagnetic layer includes at least one selected from the group consisting of Cu, Ag, Au, Al, and Cr, and
the fourth nonmagnetic layer includes at least one selected from the group consisting of Ta, Pt, W, Mo, Ir, Ru, Tb, Rh, Cr, and Pd.
15. A magnetic recording device, comprising:
a magnetic head;
a magnetic recording medium; and
an electrical circuit,
the magnetic head including
a magnetic pole,
a first shield, and
a stacked body provided between the magnetic pole and the first shield,
the stacked body including
a first magnetic layer,
a second magnetic layer provided between the first magnetic layer and the first shield,
a first nonmagnetic layer provided between the first magnetic layer and the second magnetic layer,
a second nonmagnetic layer provided between the magnetic pole and the first magnetic layer, and
a third nonmagnetic layer provided between the second magnetic layer and the first shield,
the second nonmagnetic layer including at least one selected from the group consisting of Cu, Ag, Au, Al, and Cr,
the third nonmagnetic layer including at least one selected from the group consisting of Ta, Pt, W, Mo, Ir, Ru, Tb, Rh, Cr, and Pd,
an electrical resistance of the stacked body being a first resistance when a current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of using the magnetic head to record information in the magnetic recording medium.
16. The device according to claim 15, wherein
the second current has an orientation from the first magnetic layer toward the second magnetic layer.
17. The device according to claim 15, wherein
the stacked body further includes
a third magnetic layer provided between the first nonmagnetic layer and the first magnetic layer, and
a fourth nonmagnetic layer provided between the third magnetic layer and the first nonmagnetic layer, the third magnetic layer includes a first element that includes at least one of Fe, Co, or Ni, and a second element that includes at least one selected from the group consisting of Cr, V, Mn, Ti, and Sc, the first nonmagnetic layer includes at least one selected from the group consisting of Cu, Ag, Au, Al, and Cr, and the fourth nonmagnetic layer includes at least one selected from the group consisting of Ta, Pt, W, Mo, Ir, Ru, Tb, Rh, Cr, and Pd.

* * * * *